United States Patent
Steinmetz et al.

(10) Patent No.: US 6,526,458 B1
(45) Date of Patent: Feb. 25, 2003

(54) METHOD AND SYSTEM FOR EFFICIENT I/O OPERATION COMPLETION IN A FIBRE CHANNEL NODE USING AN APPLICATION SPECIFIC INTEGRATION CIRCUIT AND DETERMINING I/O OPERATION COMPLETION STATUS WITHIN INTERFACE CONTROLLER

(75) Inventors: Joseph H. Steinmetz, Rocklin, CA (US); Matthew Paul Wakeley, Roseville, CA (US); Murthy Kompella, Roseville, CA (US); Bryan Cowger, Meadow Roseville, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/475,908

(22) Filed: Dec. 30, 1999

(51) Int. Cl.[7] ................................. G06F 3/00
(52) U.S. Cl. .............. 710/1; 710/28; 710/35; 710/57; 709/217; 711/100
(58) Field of Search .................. 710/1, 5, 15, 28, 710/31, 33, 35, 52, 57, 61; 709/213, 217, 218, 219; 711/1, 147, 169, 100

(56) References Cited

U.S. PATENT DOCUMENTS 6,065,087 A * 5/2000 Keaveny et al. ............ 710/129
6,205,145 B1 * 3/2001 Yamazaki .................... 370/395
6,279,051 B1 * 8/2001 Gates et al. ................... 710/20
6,314,477 B1 * 11/2001 Cowger et al. ............... 710/22
6,356,944 B1 * 3/2002 McCarty ..................... 709/222

* cited by examiner

Primary Examiner—Jeffrey Gaffin
Assistant Examiner—Rijue Mai

(57) ABSTRACT

A method and system for enhancing the efficiency of the completion of host-initiated I/O operations within a fiber channel node. The host computer component of the fiber channel node does not allocate the memory buffer for the FCP response frame received by the FC node at the completion of an I/O operation. Instead, the interface controller of the FC node processes FCP response frames in order to determine whether or not an I/O operation successfully completes. In the common case that the I/O operation successfully completes, the interface controller writes the FCP exchange ID corresponding to the I/O operation to a special location in memory which serves to invoke logic functions implemented in an ASIC that de-allocate host memory resources allocated for the I/O operation. In the uncommon cases in which I/O operations fail, the interface controller queues the FCP response frame retrieved from a target node to a host memory queue and queues a completion message to a second host memory queue causing the host computer to field an interrupt and handle any error conditions and memory deallocation functionality required in order to complete the I/O operation.

16 Claims, 16 Drawing Sheets

METHOD AND SYSTEM FOR EFFICIENT I/O OPERATION COMPLETION IN A FIBRE CHANNEL NODE USING AN APPLICATION SPECIFIC INTEGRATION CIRCUIT AND DETERMINING I/O OPERATION COMPLETION STATUS WITHIN INTERFACE CONTROLLER

TECHNICAL FIELD

The present invention relates to execution of host-initiated I/O operations in fibre channel nodes, and, in particular, to a method and system for employing an application specific integrated circuit and increased functionality within an interface controller component of the fibre channel node in order to eliminate unnecessary data transfers between the interface controller and the host computer or computer peripheral component of the fibre channel node and to offload processing from the host computer or computer peripheral component of the fibre channel node to the interface controller component and to the application specific integrated circuit.

BACKGROUND OF THE INVENTION

The fibre channel ("FC") is an architecture and protocol for a data communications network for interconnecting computers and peripheral devices. The FC supports a variety of upper-level protocols, including the small computer systems interface ("SCSI") protocol. A computer or peripheral device is linked to the network through an FC port and an FC link comprising copper wires or optical fibres, the computer or peripheral device, FC port, and FC link together referred to as an "FC node." An FC port includes a transceiver and an interface controller, and the computer or peripheral device in which the FC port is contained is called a "host." Hosts generally contain one or more processors, referred to as the "host processor" in the current application. The FC port exchanges data with the host via a local data bus, such as a peripheral computer interface ("PCI") bus. The interface controller conducts lower-level protocol exchanges between the fibre channel and the computer or peripheral device in which the FC port resides.

An interface controller within an FC port serves essentially as a transducer between the serial receiver and transmitter components of the FC port and the host processor of the FC node in which the FC port is contained. The interface controller is concerned with, on the input side, assembling serially-encoded data received from the receiver component into ordered sets of bytes, assembling a majority of the ordered sets of bytes into basic units of data exchange, called "FC frames," and passing the FC frames, along with status information, to the host processor within the context of larger collections of FC frames, called FC sequences and FC exchanges. On the output side, the interface controller accepts host memory buffer references and control information from the host processor, transforms them into FC frames, within higher-level contexts of FC sequences and FC exchanges, and provides the FC frames to the transmitter component of the FC port for serial transmission to the FC. The interface controller also exchanges lower-level control messages with remote nodes via the fibre channel that are used for configuring the fibre channel, maintaining state within fibre channel nodes, establishing temporary paths between nodes, arbitrating control of fibre channel loops, acknowledging receipt of data frames, and extending data transfer credits to remote nodes, among other things.

The interface controller communicates with the host processor through a set of host memory-based data structures and through a number of control registers accessible to both the interface controller and the host processor via a local bus, such as a PCI bus. At any given instant, the interface controller may be handling outgoing FC frames associated with different FC sequences, and may be also handling inbound FC frames from the FC associated with a number of FC sequences. The interface controller uses internal caches to cache information from the host memory-based data structures with which the interface controller communicates with the host processor.

The interface controller plays an analogous function within an FC port as that played by a computer processor in a multi-tasking operating system environment. The interface controller handles many different events concurrently with extremely dynamic patterns of state changes and information flow. The state of an interface controller is maintained in a number of different dynamic data structures and queues, generally stored within host memory, and accessible to both the interface controller and the host. The state of each currently active FC exchange and FC sequence is maintained in these data structures, as well as descriptors that reference incoming and outgoing frames, completion messages for write and read operations, and other such information.

I/O operations may be conducted within the context of a SCSI I/O operation embedded within the fibre channel protocol. An I/O operation is initiated by an initiator node in order to read data from, or write data to, a target node. At the conclusion of a write or read operation ("I/O operation"), the initiator node generally receives a FC response frame from the target node, whether or not the I/O operation successfully completes. This FC response frame is received by the interface controller from the fibre channel, the data contents of the FC response frame are transferred to a buffer in host memory, and a completion notice is placed into a separate completion queue in host memory by the interface controller. Thus, data is sent from the interface controller to two different host memory locations upon reception by the initiating node of a response FC frame.

In PC controllers, as in operating systems and other real-time device controllers, memory resources are scarce, and unnecessary data transfers can decrease data transfer bandwidth through buses and slow overall data throughput. FC controller designers and manufacturers have therefore recognized a need to decrease the memory resources allocated for I/O operations and decrease the number of data transfers between an FC controller and host memory during I/O operations between FC nodes.

SUMMARY OF THE INVENTION

The present invention provides a method and system for decreasing data transfer between the interface controller and host computer components of the fibre channel node and offloading processing tasks from the host computer component to the interface controller component and to an additional application specific integrated circuit component in order to increase system I/O bus bandwidth availability within the fibre channel node, decrease I/O latency, and decrease the amount of memory allocated within host computer memory for a given I/O operation. During initiation of an I/O operation, the host computer does not allocate a separate memory buffer to hold the FCP response frame returned as the final FCP sequence of the I/O operation from the target node. When an FCP response frame is returned to the interface controller component of an FC node by a target node during completion of an I/O operation, the interface controller examines data contained within the FCP response frame and compares the number of bytes transferred during the I/O operation with an expected number of bytes to be transferred during the I/O operation to determine whether or not the I/O operation has successfully completed. If the I/O operation has successfully completed, the interface controller extracts the FCP exchange ID from the FCP response frame and writes the FCP exchange ID to a special memory location implemented within the additional application specific integrated circuit ("ASIC"). The ASIC contains logic circuits that complete the I/O operation by de-allocating any memory resource allocated for the I/O operation within host computer memory. If the I/O operation has not successfully completed, then the interface controller queues the FCP response frame to a single frame sequence queue in host memory and queues a completion message to a message queue in host memory, as a byproduct of which the host computer is interrupted in order to complete the unsuccessfully completed I/O operation. In the normal case that an I/O operation successfully completes, unnecessary host memory allocation and data transfer related to transmitting the FCP response frame from the interface controller to the host memory is avoided, additional data transfer required to queue a completion message to the message queue in host memory is avoided, and the processing tasks normally undertaken by the host processor to parse data contained in the FCP response frame, de-queue the completion message, and de-allocated memory resources upon completion of the I/O operation are offloaded to the ASIC and interface controller. The net effect is. to increase I/O bus bandwidth, decrease I/O operation latency, and increase host memory availability in order to increase the number of I/O operations and other activities that can be concurrently managed within the fibre channel node.

DETAILED DESCRIPTION OF THE INVENTION

Figure 1:
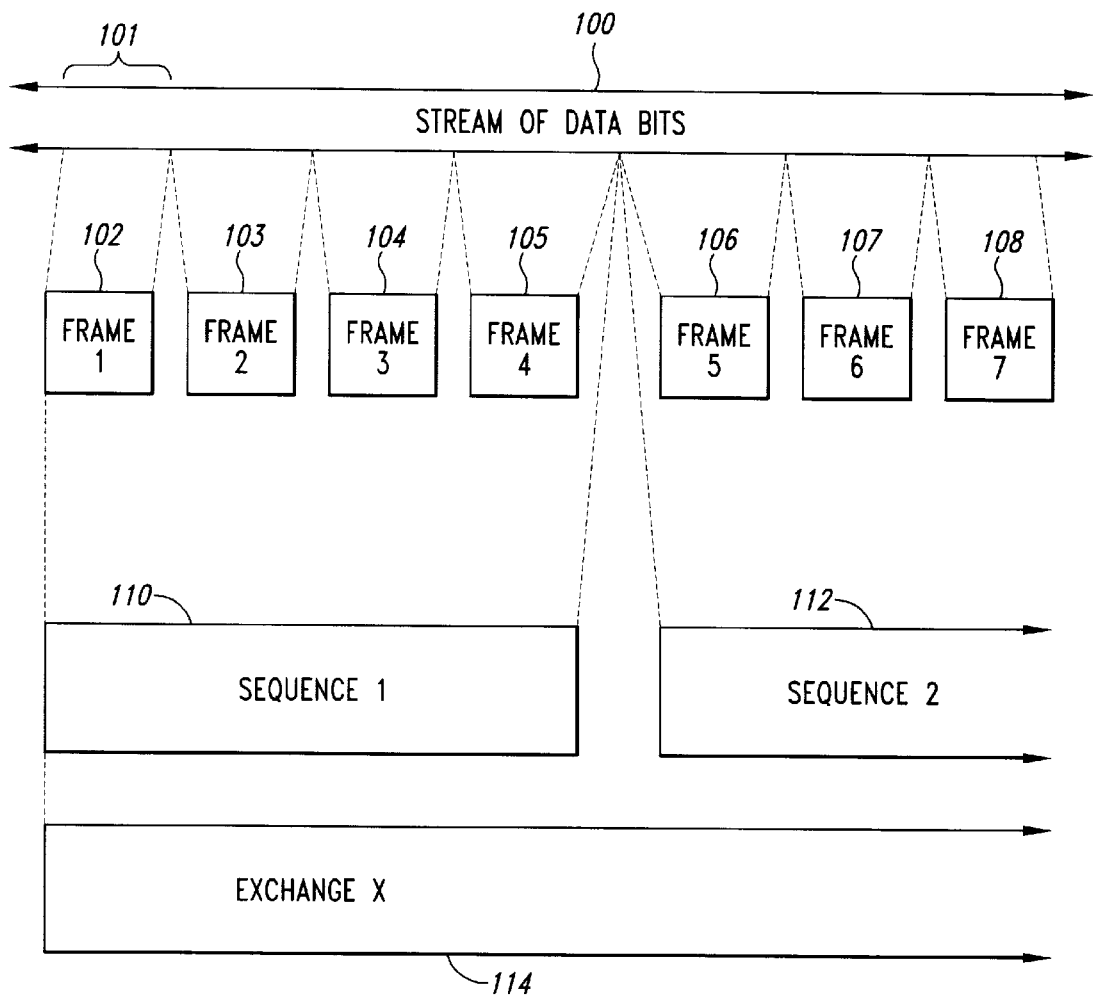
FIG. 1 illustrates a simple hierarchy by which data is organized, in time, for transfer through an FC network.

The present invention will be described below in five subsections. The first four subsections provide details about the FC, the FC protocol, FC interface-controller architecture, and the host memory interface between the interface controller and the host processor of an FC node. The fifth subsection provides a description of the present invention.

Fibre Channel

The Fibre Channel ("FC") is defined by, and described in, a number of ANSI Standards documents, including: (1) Fibre Channel Physical and Signaling Interface ("FC-PH"), ANSI X3.230-1994, ("FC-PH-2), ANSI X3.297-1997; (2) Fibre Channel—Arbitrated Loop ("FC-AL-2"), ANSI X3.272-1996; (3) Fibre Channel—Private Loop SCSI Direct Attached ("FC-PLDA"); (4) Fibre Channel—Fabric Loop Attachment ("FC-FLA"); (5) Fibre Channel Protocol for SCSI ("FCP"); (6) Fibre Channel Fabric Requirements ("FC-FG"), ANSI X3.289:1996; and (7) Fibre Channel 10-Bit Interface. These standards documents are under frequent revision. Additional Fibre Channel System Initiative ("FCSI") standards documents include: (1) Gigabaud Link Module Family ("GLM"), FCSI-301; (2) Common FC-PH Feature Sets Profiles, FCSI-101; and (3) SCSI Profile, FCSI-201. These documents may be found at the world wide web Internet page having the following address:

"http://www.fibrechannel.com"

The following description of the FC is meant to introduce and summarize certain of the information contained in these documents in order to facilitate discussion of the present invention. If a more detailed discussion of any of the topics introduced in the following description is desired, the above-mentioned documents may be consulted.

In the following discussion, "FC" is used as an adjective to refer to the general Fibre Channel architecture and protocol, and is used as a noun to refer to an instance of a Fibre Channel communications medium. Thus, an FC (architecture and protocol) port may receive an FC (architecture and protocol) sequence from the FC (communications medium).

The FC protocol is an architecture and protocol for data communications between FC nodes, generally computers, workstations, peripheral devices, and arrays or collections of peripheral devices, such as disk arrays, interconnected by one or more communications media. Communications media include shielded twisted pair connections, coaxial cable, and optical fibers. An FC node is connected to a communications medium via at least one FC port and FC link. An FC port is an FC host adapter or FC controller that shares a register and host memory interface with the host processing components of the FC node, and that implements, in hardware and firmware, the lower levels of the FC protocol. The FC host generally exchanges data and control information with the FC port using shared data structures in shared memory and using control registers in the FC port. The FC port includes serial transmitter and receiver components coupled to a communications medium via an FC link that comprises electrical wires or optical strands.

The FC is a serial communications medium. Data is transferred one bit at a time at extremely high transfer rates. FIG. 1 illustrates a very simple hierarchy by which data is organized, in time, for transfer through an FC network. At the lowest conceptual level, the data can be considered to be a stream of data bits 100. The smallest unit of data, or grouping of data bits, supported by an FC network is a 10-bit character that is decoded by FC port as an 8-bit character. FC primitives are composed of 10-bit characters or bytes. Certain FC primitives are employed to carry control information exchanged between FC ports. The next level of data organization, a fundamental level with regard to the FC protocol, is a frame. Seven frames 102–108 are shown in FIG. 1. A frame may be composed of between 36 and 2,148 bytes of data, depending on the nature of the data included in the frame. The first FC frame, for example, corresponds to the data bits of the stream of data bits 100 encompassed by the horizontal bracket 101. The FC protocol specifies a next higher organizational level called the sequence. A first sequence 110 and a portion of a second sequence 112 are displayed in FIG. 1. The first sequence 110 is composed of frames one through four 102–105. The second sequence 112 is composed of frames five through seven 106–108 and additional frames that are not shown. The FC protocol specifies a third organizational level called the exchange. A portion of an exchange 114 is shown in FIG. 1. This exchange 114 is composed of at least the first sequence 110 and the second sequence 112 shown in FIG. 1. This exchange can alternatively be viewed as being composed of frames one through seven 102–108, and any additional frames contained in the second sequence 112 and in any additional sequences that compose the exchange 114.

The FC is a full duplex data transmission medium. Frames and sequences can be simultaneously passed in both directions between an originator, or initiator, and a responder, or target. An exchange comprises all sequences, and frames within the sequences, exchanged between an initiator, or originator, and a responder, or target, during a single I/O transaction, such as a read I/O transaction or a write I/O transaction. The FC protocol is designed to transfer data according to any number of higher-level data exchange protocols, including the Internet protocol ("IP"), the Small Computer Systems Interface ("SCSI") protocol, the High Performance Parallel Interface ("HIPPI"), and the Intelligent Peripheral Interface ("IPI"). The standard adaptation of SCSI protocol to fibre channel is subsequently referred to in this document as "FCP." Thus, the FC can support a master-slave type communications paradigm that is characteristic of the SCSI bus and other peripheral interconnection buses, as well as the relatively open and unstructured communication protocols such as those used to implement the Internet. The SCSI bus architecture concepts of an initiator and target are carried forward in the FCP, designed, as noted above, to encapsulate SCSI commands and data exchanges for transport through the FC. The discussion below will relate only to the FCP protocol on the fibre channel and to the SCSI protocol discussed above.

FC Protocol

Figure 2:
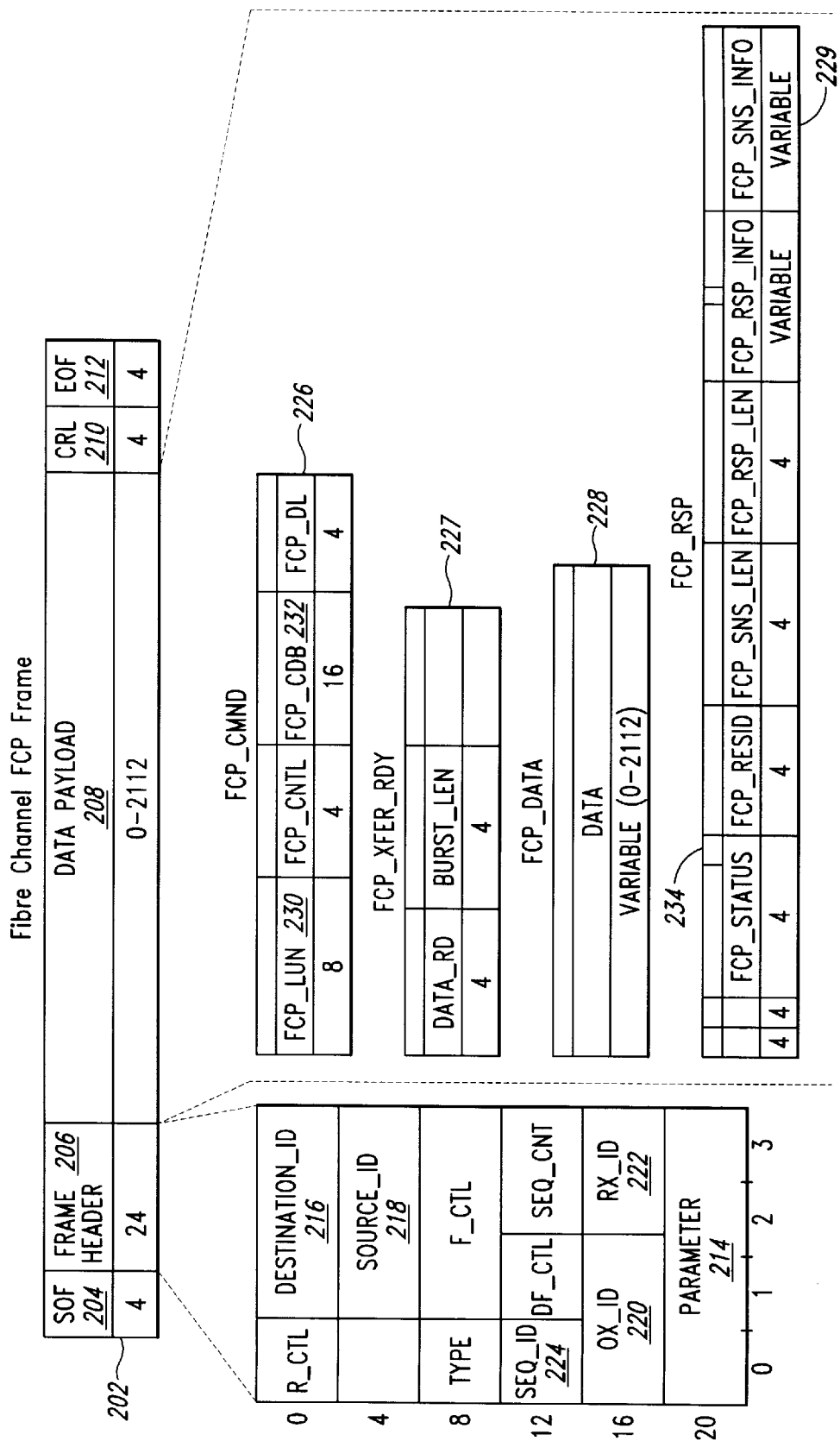
FIG. 2 illustrates the conceptual contents of an FC frame.

FIG. 2 illustrates the conceptual contents of a fibre channel frame. The fibre channel frame 202 comprises five high-level sections 204, 206, 208, 210 and 212. The first high-level section, called the start-of-frame deliminator 204, comprises 4 bytes that mark the beginning of the frame. The next high-level section, called frame header 206, comprises 24 bytes that contain addressing information, sequence information, exchange information, and various control flags. A more detailed view of the frame header 214 is shown expanded from the fibre channel frame 202 in FIG. 2. The destination ID 216 is a 24-bit fibre channel address indicating the destination port for the frame. The source ID 218 is a 24-bit address that indicates the port that transmitted the frame. The originator ID, or QX_ID 220, and the responder ID 222, or IX_ID, together compose a 32-bit exchange ID that identifies the exchange to which the frame belongs. The sequence ID 224 identifies the sequence to which the frame belongs.

The next high-level section 208, called the data payload, contains the actual data packaged within the FCP frame. The data payload can be formatted according to four basic types of data payload layouts 226–229. The first of these layouts 226, called the FCP_CMND, is used to send a SCSI command from an initiator to a target. The FCP_LUN field 228 comprises a 8-byte address that specifies a particular SCSI adapter, a target device associated with that SCSI adapter, and a logical unit number corresponding to a physical device associated with the specified target SCSI device. An SCSI command is contained within the 16-byte field FCP_CDB 230. The second type of data payload format 227 shown in FIG. 2 is called the FCP_XFER_RDY layout. This data payload format is used to transfer a proceed command from the target to the initiator when the target is prepared to begin receiving or accepting data. The third type of data payload format 228 shown in FIG. 2 is the FCP_DATA format, used for transferring the actual data that is being read or written as a result of execution of an I/O transaction. The final data payload layout 229 shown in FIG. 2 is called the FCP_RSP layout, used to transfer a SCSI status byte 234, as well as other FCP status information, from the target back to the initiator upon completion of the I/O transaction. In the following discussion, an FC frame containing an FCP_CMND, FCP_XFER_RDY, FCP_DATA, or FCP_RSP data payload will be referred to as an FCP_CMND frame, FCP_XFER_RDY frame, FCP_DATA frame, or FCP_RSP frame, respectively.

Figure 3A:
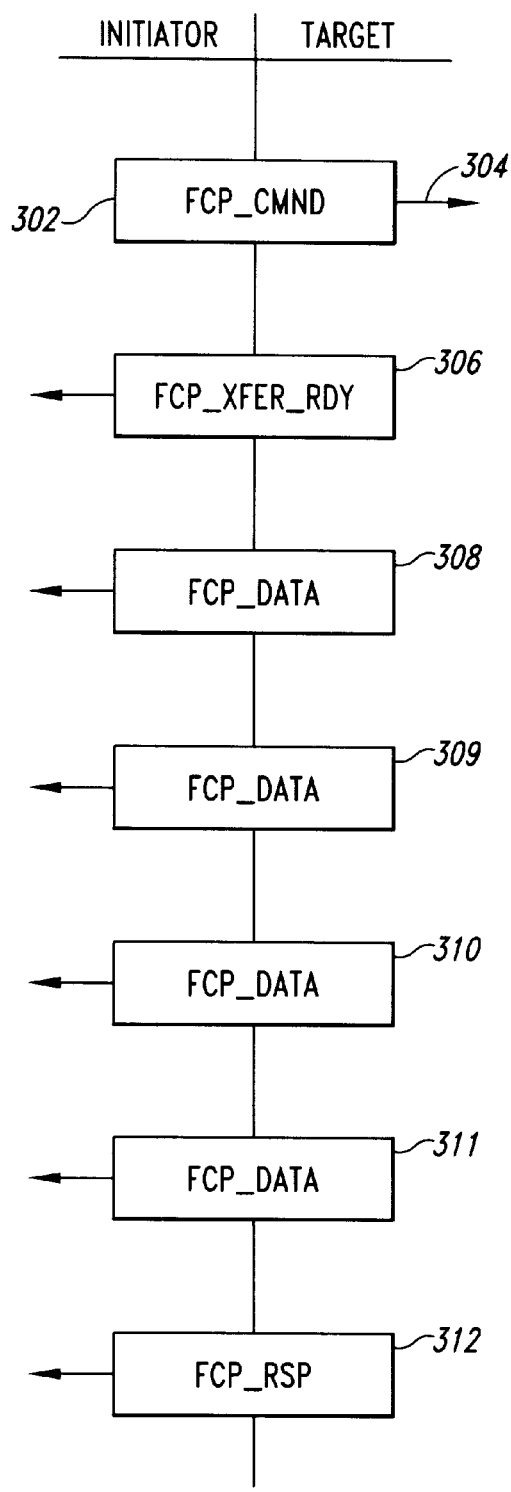
FIGS. 3A and 3B illustrate a generalized sequence of FC frames exchanged between an initiator node and a target node during a read I/O operation and a write I/O operation, respectively.
Figure 3B:
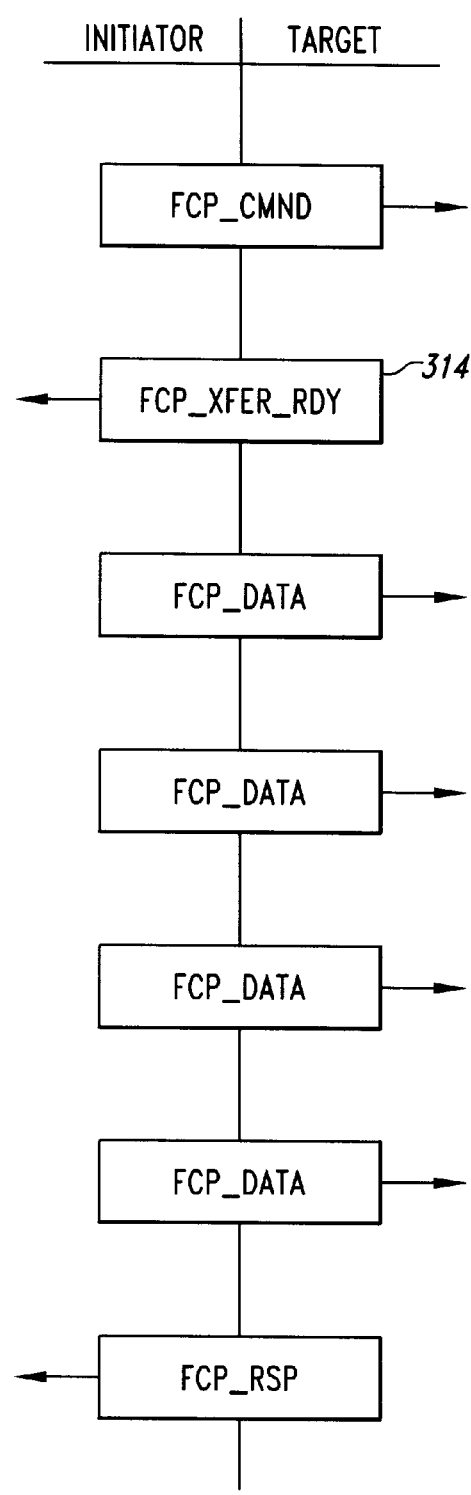

FIGS. 3A and 3B illustrate a generalized sequence of FC frames exchanged between an initiator node and a target node during a read I/O operation and a write I/O operation, respectively. In both figures, FC frames are represented as rectangles, such as FC frame 302, and arrows, such as arrow 304, indicate the direction that the FC frame is sent. Arrows pointing towards the right, such as arrow 304, indicate that an FC frame is transmitted from an initiator node to a target node, and arrows pointing to the left indicate that an FC frame is transmitted from a target node to an initiator node. The sequence of FC frames in both figures proceeds from an initial FC frame, at the top of the figures, to a final FC frame, at the bottom of the figures, in time order.

A read I/O operation is initiated when an initiator node sends an initial FC sequence comprising a FCP_CMND frame 302 through the FC to the target node. After the target node receives the FCP_CMND frame, and prepares itself for the read operation, the target node may send a second FC sequence comprising an FCP_XFER_RDY frame 306 back to the initiator node to indicate that data transmission can now proceed. This sending of an FCP_XFER_RDY frame by the target node is optional, in the case of a read I/O operation. The target node then reads data from a physical device and transmits that data as a number of FCP_DATA frames 308–311, together composing a third sequence of the exchange corresponding to the I/O read transaction, to the initiator node through the FC. When all the data has been transmitted, and the target node packages a status byte into an FCP_RSP frame 312 and transmits the FCP_RSP frame back to the initiator node through the FC. This completes the read I/O operation.

FIG. 3B shows, in similar fashion to FIG. 3A, an example of FC frames exchanged during a write I/O transaction between an initiator node and a target node. FIG. 3B differs from FIG. 3A only in the fact that, during a write I/O operation, the FCP_DATA frames are transmitted from the initiator node to the target node over the FC and the FCP_XFER_RDY FC frame 314 sent from the target node to the initiator node is not optional, as in the case of the read I/O operation, but is instead mandatory.

FC Interface-Controller Architecture

Figure 4:
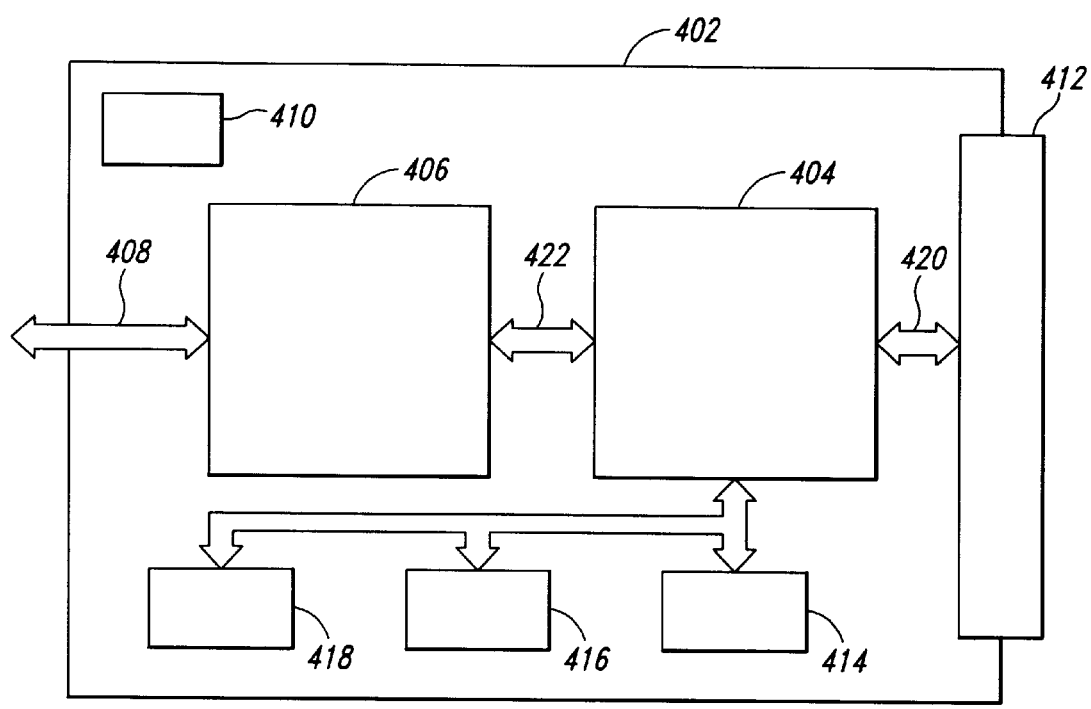
FIG. 4 shows a typical FC interface controller incorporated into a typical FC/PCI host adapter.

FIG. 4 shows a typical FC Interface Controller ("FCIC") incorporated into a typical FC/PCI host adapter. The FC/PCI host adapter 402 comprises the FCIC 404, a transceiver chip 406, an FC link 408, a clock 410, a backplane connector 412, and, optionally, a boot flash ROM 414, a local synchronous static random access memory ("RAM") 416, and a local memory 418. The FC/PCI host adapter 402 communicates with the processor or processors of an FC node via the backplane connector 412 and a PCI bus within the FC node to which the processor or processors are coupled. The FCIC 404 is coupled to the backplane connector 412 via a PCI interface 420. The FCIC sends and receives FC frames to and from an FC via a 10-bit interface 422 that couples the FCIC to the transceiver chip 406, which is, in turn, coupled to the FC via the FC link 408. The clock 410 interfaces to various FC host adapter components to provide timing signals for synchronizing operations of the components. The FC host adapter 402 may serve, in terms of the previous discussion, as an FC port, and the FC host adapter 402 together with the computer system to which it is coupled via the backplane connector 412, compose an FC node that may be connected via the FC link 408 to the FC.

Figure 5:
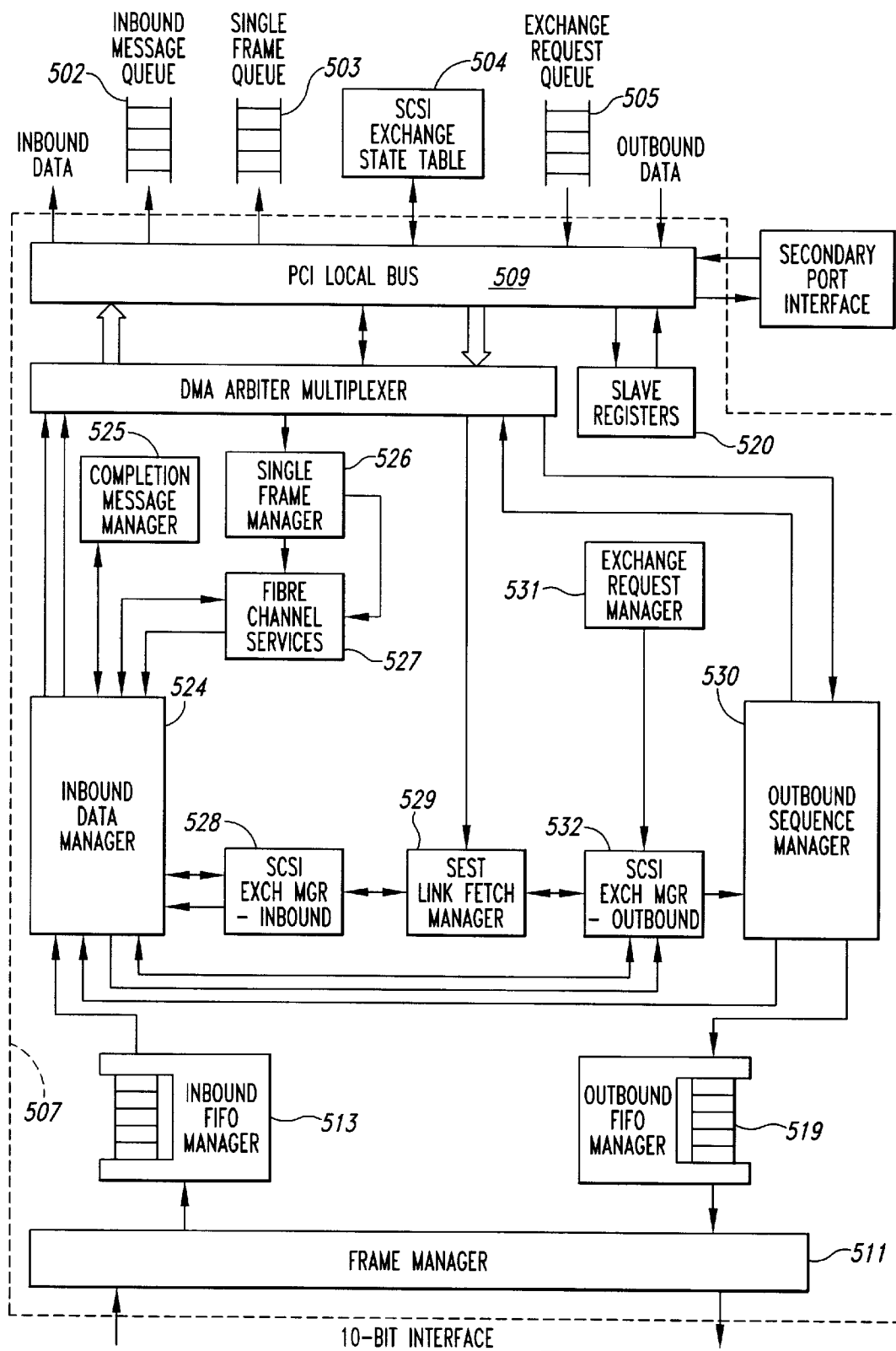
FIG. 5 shows a block diagram of a typical FC interface controller and the memory-based data structure interface between the typical FC interface controller and a host.

FIG. 5 shows a block diagram description of a typical FC interface controller and the memory-based data structure interface between a typical FC interface controller and a host. The memory-based data structures 502–505 are maintained in a memory component of the host processor accessible to the FCIC via the PCI bus 509. In FIG. 5, the FCIC 507 is represented as being combined with the backplane connector (412 in FIG. 4) and PCI bus 509. The FCIC interfaces with a transceiver chip (406 in FIG. 4) via a 10 bit/8 bit decoder and 8 bit/10 bit encoder that together comprise a 10-bit interface to which a frame manager 511 interfaces. The frame manager 511 receives FC frames for transmission to the transceiver chip (406 in FIG. 4) from the FCIC via an outbound FIFO manager 513 and receives a stream of data bits from the transceiver chip (406 in FIG. 4) via the 10 bit/8 bit decoder interface, processes the received data bits into FC frames, and stores the FC frames into an inbound FIFO manager 514. Both the outbound and inbound FIFO managers 513 and 514 buffer frames, allowing for pipelining of outbound frames and cyclic redundancy check ("CRC") validation of inbound frames, respectively.

The host processor of the FC node controls and exchanges information with the FCIC by writing and reading various control registers 520 and by placing data into, and removing data from, the memory-based data structures 502–505. Internal components of the FCIC 524–532 read and write control registers 522, receive data from, and place data into, the memory based data structures 502–505, and exchange FC frames with the frame manager 511 via the inbound FIFO manager 513 and the outbound FIFO manager 514.

The inbound message queue ("IMQ") 502 contains completion messages that notify the host processor of inbound and outbound transaction information and status information. The single frame queue ("SFQ") 503 contains inbound unknown or unassisted FC frames that the FCIC 507 receives from the frame manager 511 and places into the SFQ. The SCSI exchange state table ("SEST") 504 is shared between the FCIC and the host and contains SEST entries that each corresponds to a current SCSI exchange (I/O operation). The exchange request queue ("ERQ") 505 contains I/O request blocks ("IRBs") that represent I/O requests initiated by the host or by remote FC nodes.

The completion message manager 525 manages the IMQ and provides queue entries to the inbound data manager 524 into which the inbound data manager places completion messages. The single frame manager 526 manages the SFQ in host memory and provides entries to the FC services component 527 into which the FC component services place inbound frames. The exchange request manager 531 fetches new entries from the ERQ and sends them to the SCSI exchange manger-outbound ("SEM-OUT") 532 for processing. The inbound data manager 524 informs the inbound frame processors, i.e. the SCSI exchange manager-inbound ("SEM-IN") 528 and FC services component 527 of new frames and routes the frames to their proper destination in the host. Also, the inbound data manager sends completion messages to the host via the IMQ 502. The FC services component 527 manages the FC frames that the SEM-IN 528 does not manage. The FC services component places the frames in the SFQ 503. The SEM-IN 528 manages the phases of a SCSI exchange that receive an FC sequence. The SEM-IN reads the SEST entries via the SEST link fetch manager 529 and either sends the inbound data to the proper host buffers or sends the request to the SEM-OUT 532 to send the next phases of an FC sequence. The SEST link fetch manager 529 is responsible for reading and writing SEST entries, depending upon requests from the SEM-IN 528 and SEM-OUT 532 components. The SEM-OUT 532 manages the phases of a SCSI exchange that require an FC sequence to be sent. The SEM-OUT 532 reads the SEST entries via the SEST link fetch manager 529, builds the request to send those sequences, and sends the requests to the outbound sequence manager 530. The outbound sequence manager ("OSM") 530 processes requests from the SEM-OUT 532 to send FC sequences from the host and retrieves FC frame headers and payloads from the host to send to the remote node. The OSM segments the sequence into FC frames of up to 2 KByte in size and queues them into the outbound FIFO manager 514.

Figure 6:
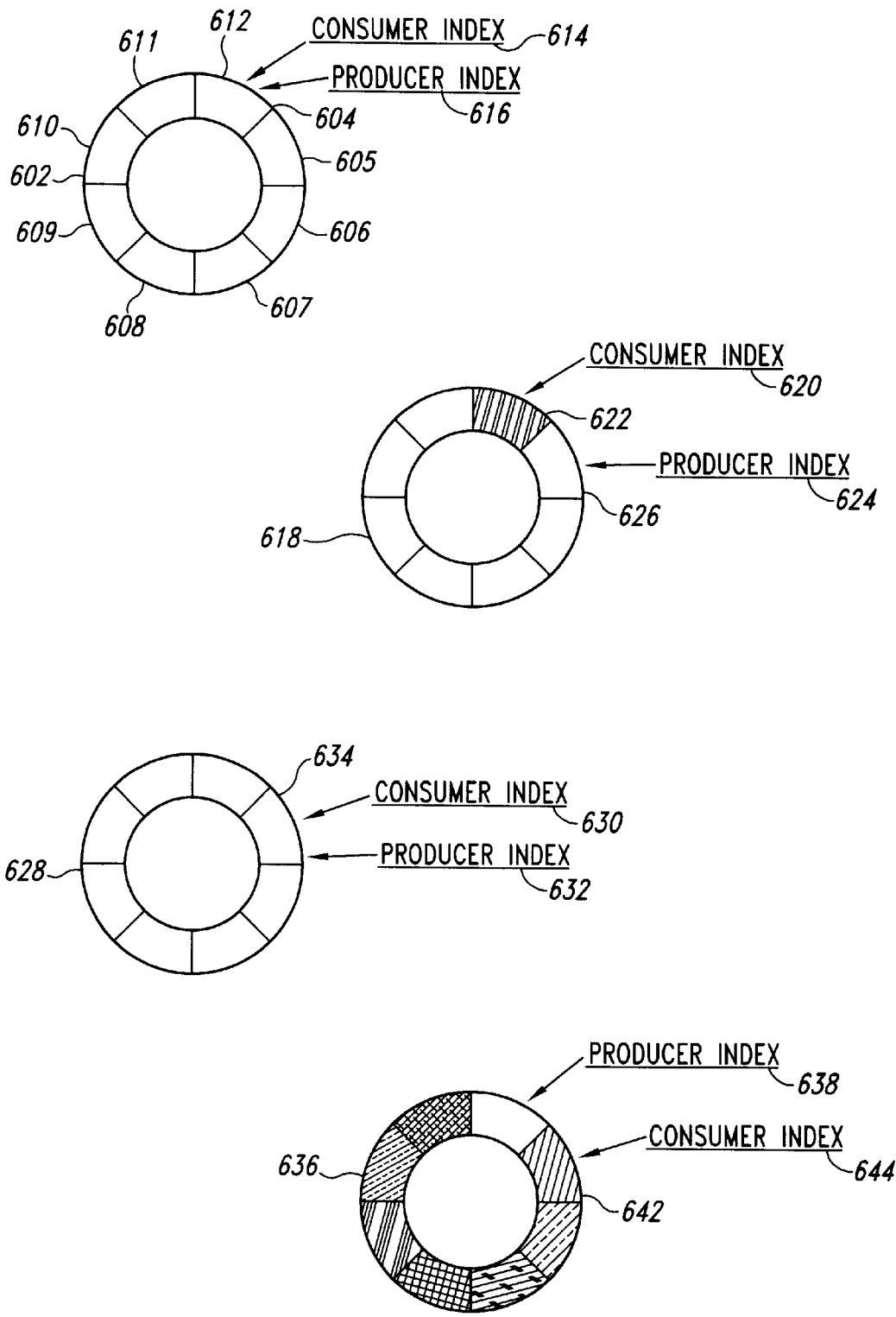
FIG. 6 shows the basic underlying circular queue data structure used in the host processor/interface controller interface within an FC node.

The IMQ 502, SFQ 503, and ERQ 505 are implemented as circular queues. FIG. 6 shows the basic underlying circular queue data structure used in the FCIC controller interface. A circular queue is a first-in-first-out ("FIFO") queue that is logically represented in a circular fashion, such as the depiction of the circular queue 602 at the top of FIG. 6. Each radial section 604–612, or slot, of a circular queue contains space for a queue entry, essentially a record-like data structure containing one or more data fields. The circular queue 602 in FIG. 6 is shown with 8 queue entry slots 604–612 although, in practice, a circular queue may have many tens or hundreds of queue entries. In addition to the queue entry slots, a circular queue is associated with two pointers: (1) a consumer index that points to the next queue entry that can be removed from the circular queue by a consumer of queue entries; and (2) a producer index that points to the next open slot within the circular queue in which a producer can place a queue entry to be added to the queue. In an empty circular queue 1402, in which all the queue entry slots are available for placement of data by a producer and in which none of the queue entry slots contain valid queue entries to be consumed by a consumer, both the consumer index 614 and the producer index 616 point to the same empty queue entry slot 612.

When a producer adds a queue entry to an empty circular queue 602, a circular queue with one valid queue entry 618 is produced. The consumer index 620 is not changed, as a result of which the consumer index points to the single valid queue entry 622 in the circular queue 618. After the producer inserts the queue entry 622, the producer increments the producer index 624 to point to the next available slot 626 within the circular queue 618 into which the producer can add a second queue entry. If the consumer now removes the single queue entry 622, an empty circular queue 628 is produced. When the consumer has removed the available queue entry 622, the consumer increments the consumer index 630. As in the previous depiction of an empty circular queue 602, the empty circular queue 628 produced by removing the single queue entry 622 has both the consumer index 630 and the producer index 632 pointing to the same empty, available queue entry slot 634. If a producer successively adds queue entries at a faster rate than a consumer can consume them, a full circular queue 636 will eventually be produced. In a full circular queue 636, the producer index 638 points to a single empty queue entry slot within the circular queue that immediately precedes the first available valid queue entry 642 pointed to by the consumer index 644.

Figure 7A:
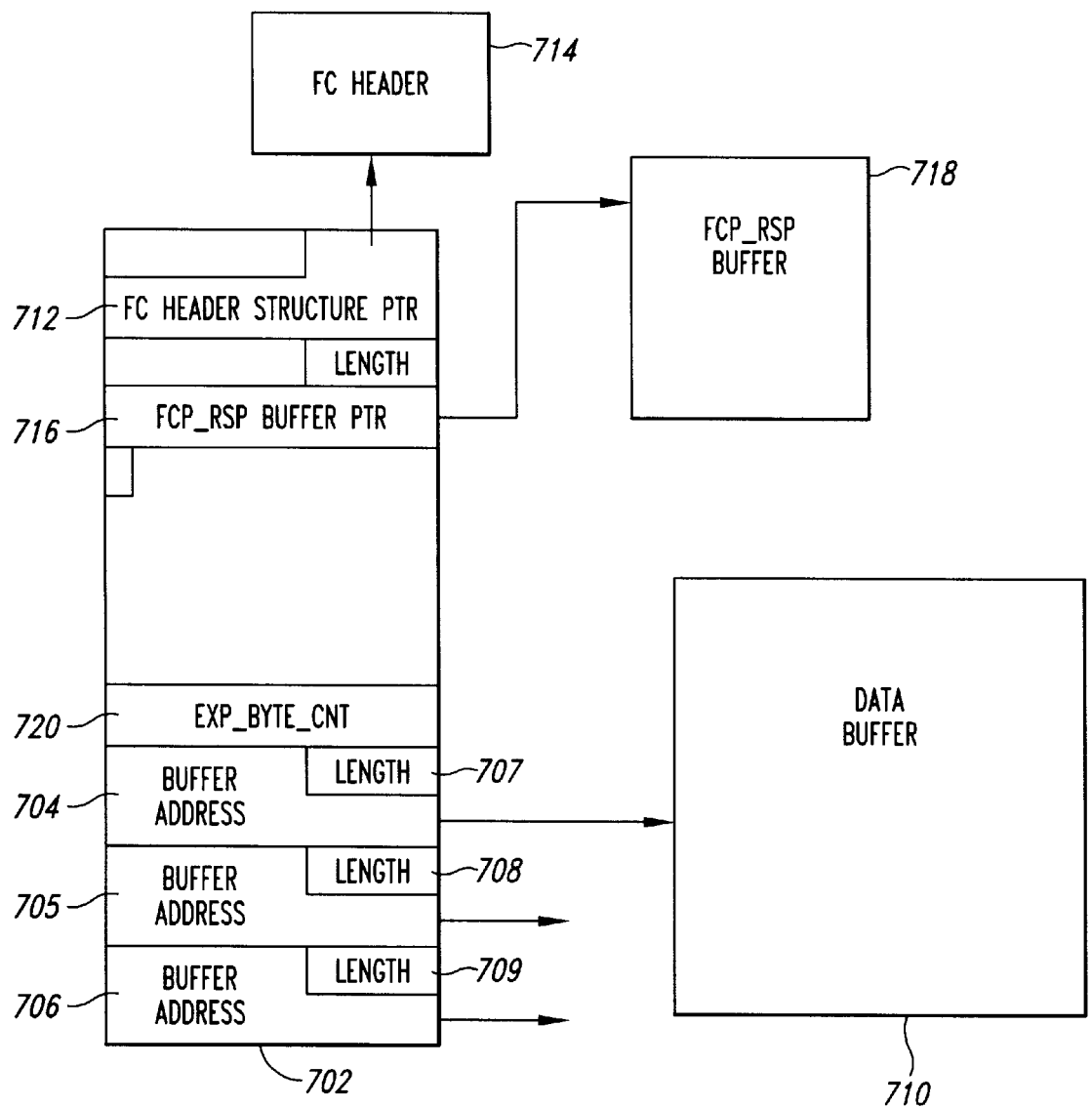
FIGS. 7A–B are block diagrams illustrating a SEST entry along with associated data structures.
Figure 7B:
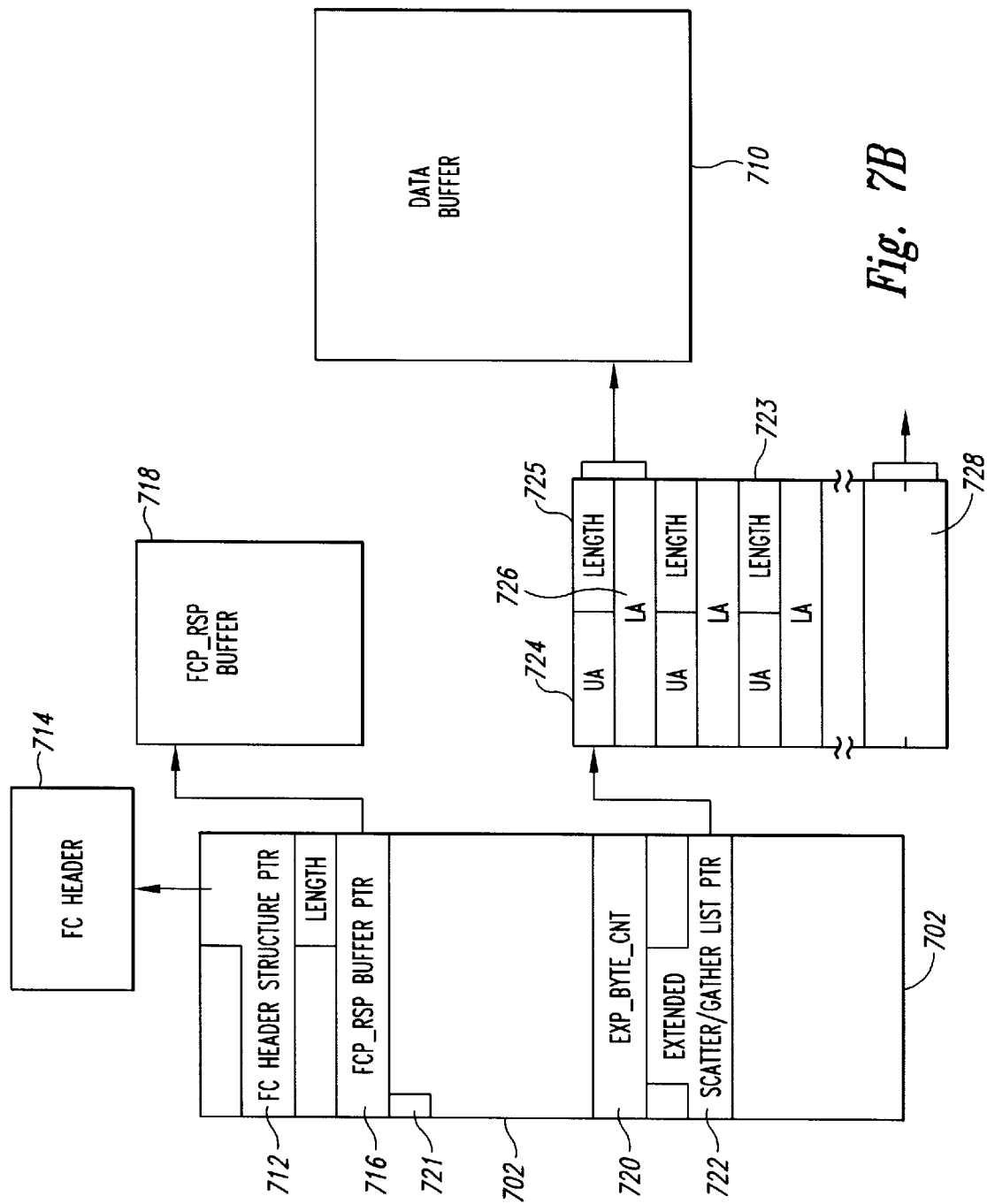

FIGS. 7A–B are block diagrams illustrating a SEST entry along with associated data structures. The SEST entry illustrated in FIG. 7A is used when the data to be transmitted or received during an I/O operation can fit within a small number of buffers, and the SEST entry illustrated in FIG. 7B is used for I/O operations in which the data to be transmitted or received is sufficiently voluminous to require more than three memory buffers. Common aspects of the two types of SEST entries and associated data structures are described and labeled with reference to FIG. 7A. These same labels are employed in FIG. 7B, and those aspects of 7B already described with reference to 7A will not be further described.

A SEST entry 702 includes references to various memory buffers for storage of received data, in the case of a read I/O operation, and for storing data to be transmitted, in the case of a write I/O operation. A SEST entry of the type illustrated in FIG. 7A is employed for relatively short data transfer operations, or when large memory buffers may be allocated for storing data in host memory. The SEST entry includes three data buffer pointers 704–706 along with associated length fields 707–709 that characterize the length of each data buffer referenced by the data buffer pointers 704–706. In FIG. 7A, a data buffer 710 is shown referenced by the first data buffer pointer 704, the length of the data buffer described by the length field 707. Thus, three data buffers can be referenced from the type of SEST displayed in FIG. 7A. In the case of a host-initiated write I/O operation, the SEST additionally contains a pointer 712 to a FC header buffer 714 that is prepared by the host processor to contain an FCP_DATA frame header that can be copied into FCP_DATA frames by the FCIC during transmission of data to a target node. The SEST entry additionally contains an FCP_RSP frame buffer pointer 716 that points to an FCP_RSP frame buffer 718 in which the FCIC places the final FCP_RSP frame following receipt by the FCIC of a final FCP_RSP frame from the target node. In the case of a host-initiated read I/O operation, FCP_DATA frames are not transmitted by the FCIC, but are instead received by the FCIC, and therefore the FCP_RSP frame buffer pointer 716 and FCP_RSP frame buffer 718 are not needed. The SEST entry includes additional flags and fields for maintaining state during execution of an I/O operation by the FCIC, for describing various aspects of the I/O operation, and for identifying a particular I/O operation. One of these additional fields is the EXP_BYTE_CNT field 720 that, in the case of both write and read I/O operations, contains an integer specifying the number of bytes of data expected to be transmitted during the I/O operation. Other fields, not shown in FIGS. 7A–B, include current offsets into data buffers specifying the next location from which data is obtained by the FCIC, in the case of a write operation, or at which received data can be placed, in the case of a read I/O operation, the RX_ID for the I/O operation, a valid bit flag indicating whether or not the SEST entry is valid, and additional fields.

When more than three data buffers are required to hold the data transferred during an I/O operation, a SEST entry of the type illustrated in FIG. 7B is employed. The SEST entry has the same length, in bytes, as the SEST entry in FIG. 7A, and contains the same fields as the SEST entry in FIG. 7A up through the EXP_BYTE_CNT field 720. However, instead of the three buffer pointers 704–706 contained in the final 24 bytes of the SEST entry shown in FIG. 7A, the SEST entry shown in FIG. 7B contains a single pointer 722 to an extended scatter/gather list. A SEST entry of the type shown in FIG. 7A is differentiated from a SEST entry shown in FIG. 7A by the value of a LOC bit 721. The extended scatter/gather list is comprised of an arbitrary number of scatter/gather list entries, such as the scatter/gather list entry 723. These entries include a number of data buffer pointers, such as the data buffer pointer comprising fields 724 and 726, each data buffer pointer associated with a length field, such as the length field 725 associated with the data buffer pointer comprising fields 724 and 726. The final two words of a scatter/gather list entry 728 either point to a next scatter/gather list entry, or contain the value 0, indicating the end of the scatter/gather list.

Figure 8:
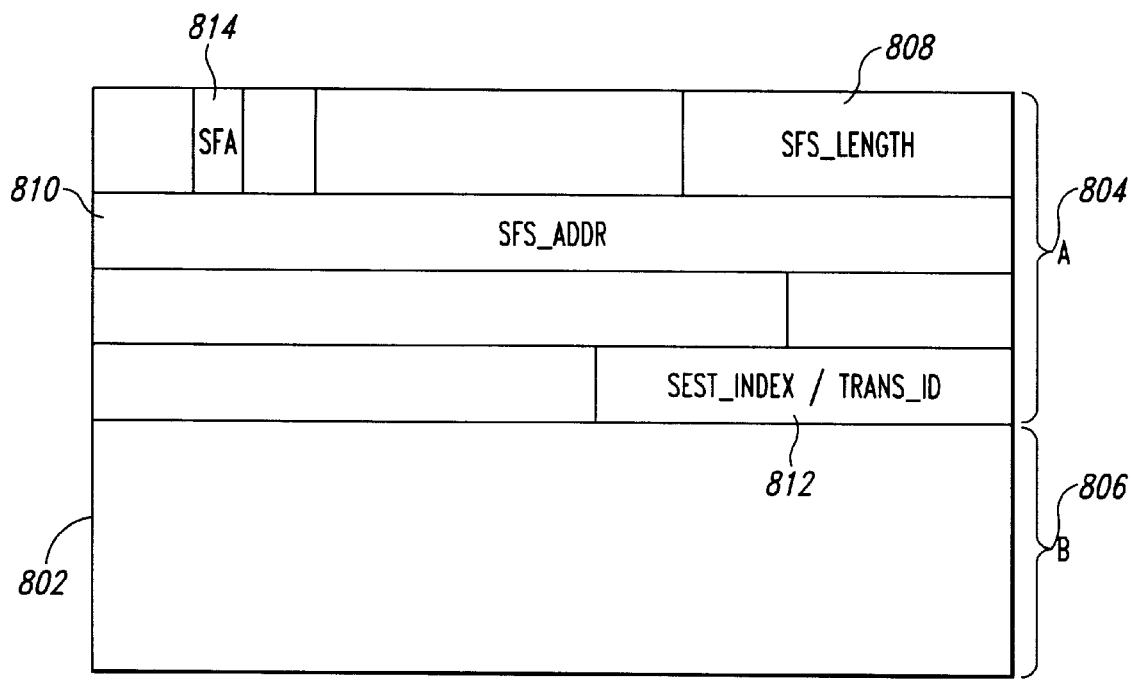
FIG. 8 illustrates an I/O request block.

FIG. 8 illustrates an I/O request block. An I/O request block ("IRB") is contained in each entry of the ERQ (505 in FIG. 5). An IRB 802 contains two separate I/O request descriptors, an A descriptor 804 and a B descriptor 806. These two descriptors are identical, and only the I/O request A descriptor 804 will be described below. An I/O request descriptor includes an SFS_length field 808 and a SFS_Addr field 810 that describe the length and address, respectively, of an FC header buffer that contains an FCP_CMND header, prepared by the host processor, for use as the initial FCP_CMND frame sent by the FCIC at the beginning of the I/O operation described by the I/O request descriptor. An I/O request descriptor additionally includes a SEST_index field 812 that contains the index of the SEST entry associated with the I/O operation described by the I/O request descriptor (702 in FIGS. 7A–B). This field contains a SEST index if an SFA bit flag 814 is clear. If the SFA bit flag 814 is set, then the operation described by the I/O request descriptor is a single frame sequence operation, and the SFS_length and SFS_Addr field 808 and 810 describe the single frame to be transmitted for the operation.

Figure 9:
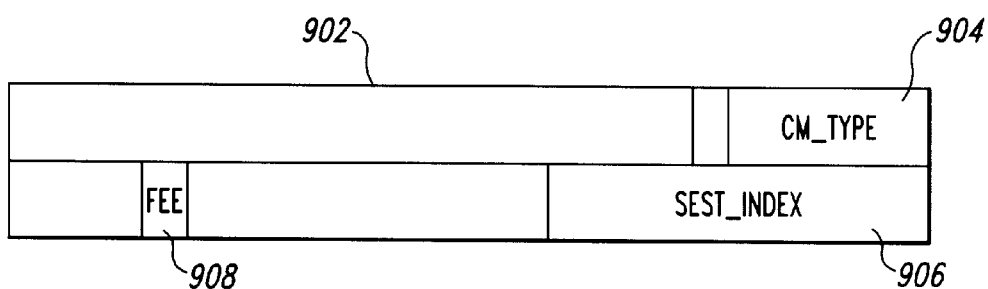
FIG. 9 illustrates an inbound FCP exchange completion message.

FIG. 9 illustrates an inbound FCP exchange completion message. This inbound FCP completion message is one type of completion message that may be queued to the IMQ (502 in FIG. 5) by the FCIC on completion of an I/O operation. The inbound FCP exchange completion message includes a completion message type field 904, containing the value 0x0c, in the case of an inbound FCP exchange completion message, and a SEST_index field 906 that contains the index of the SEST entry describing the I/O operation corresponding to the inbound FCP exchange completion message. The inbound FCP exchange completion message contains additional fields and bit flags, and reserved space for additional fields and bit flags, including space for an FEE bit flag 908, to be described below.

Figure 10:
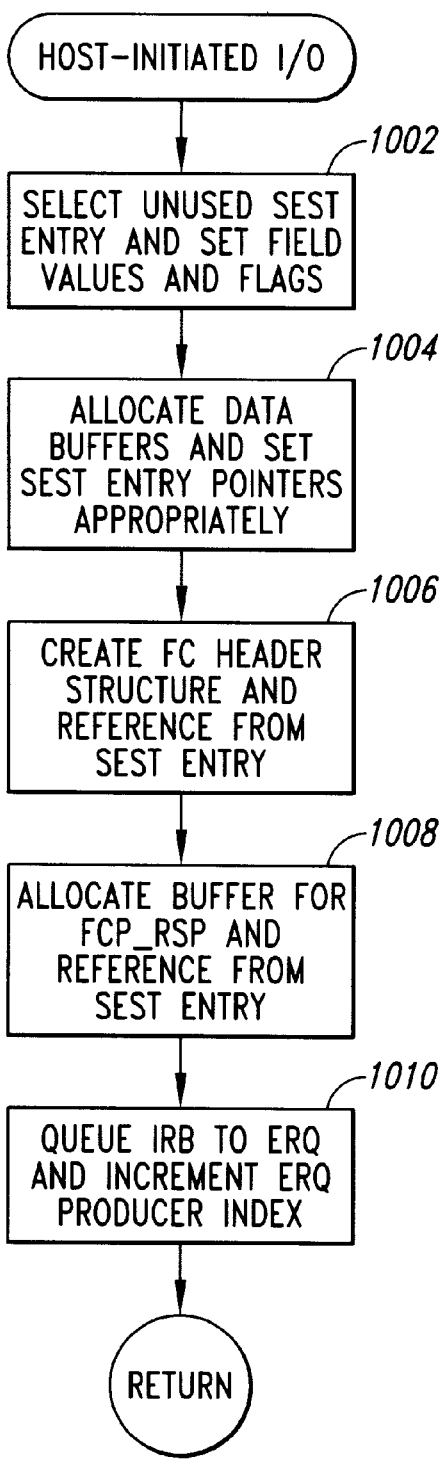
FIG. 10 is a flow control diagram for the initial host-executed portion of an I/O operation.
Figure 11:
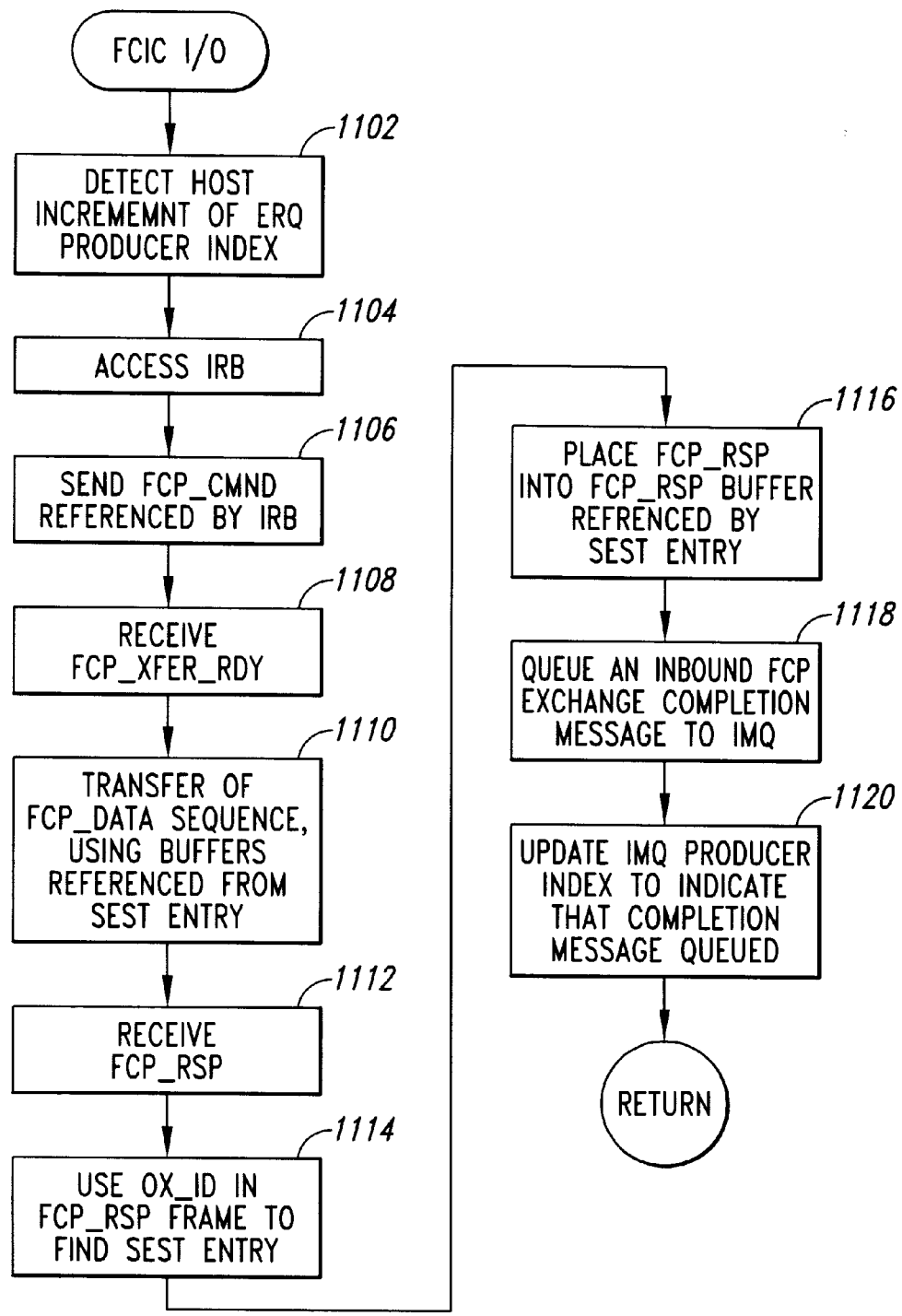
FIG. 11 is a flow-control diagram that describes steps carried out by an FC interface controller for execution of an I/O operation.
Figure 12:
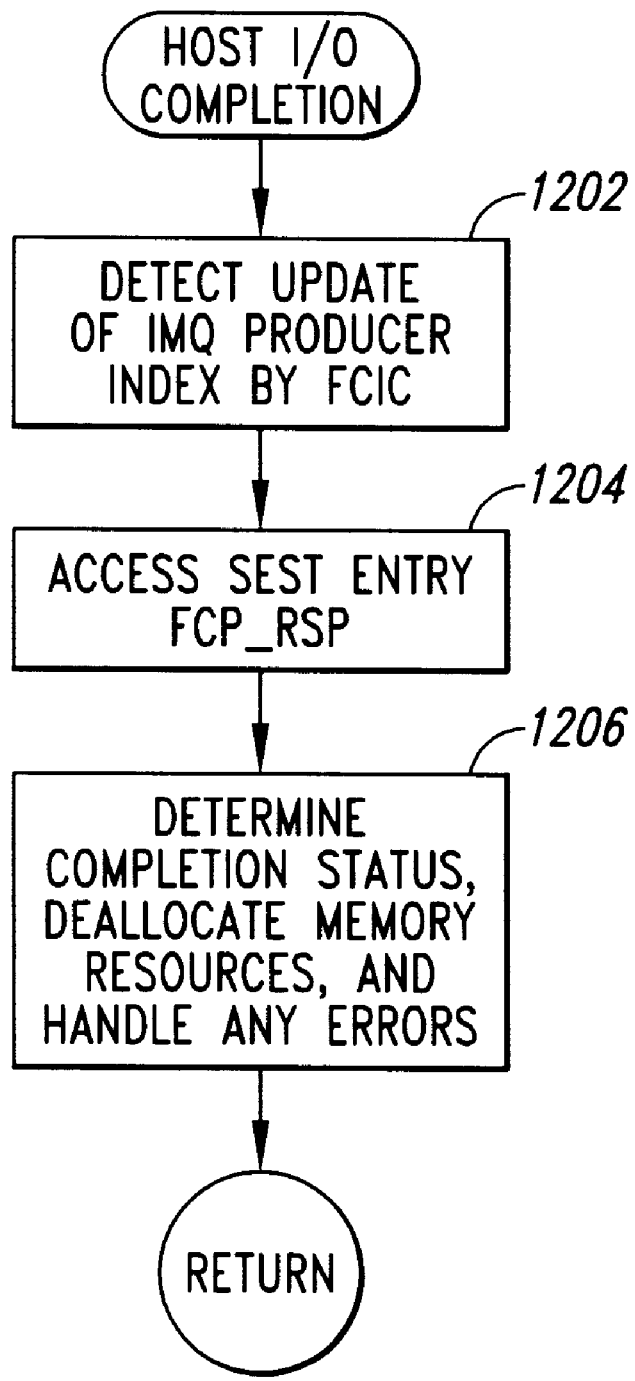
FIG. 12 illustrates the final steps undertaken by a host processor to complete an I/O operation.

FIGS. 10–12 are flow control diagrams describing host and FCIC actions related to execution of a host-initiated I/O operation, with reference to the host memory data structures illustrated in FIGS. 5–9. FIG. 10 is a flow control diagram for the initial host-executed portion of an I/O operation. In step 1002, the host selects an unused SEST entry and initializes various of the fields and bit flags to reflect the type of I/O operation desired. In step 1004, the host allocates data buffers and incorporates references to those data buffers within the SEST. As described above, either of two different types of SEST entries can be used, depending on the number of data buffers required. In the case of a write I/O operation, the host additionally transfers the data to be written to a target node into the data buffers. In step 1006, in the case of a write operation, the host prepares an FC header within a FC header buffer for the FCP_DATA frames to be sent by the FCIC and incorporates a reference to the FC header buffer into the SEST entry. In step 1008, the host allocates a buffer for the FCP_RSP frame that is returned to the FCIC by the target node at the end of the I/O operation and incorporates a reference to the FCP_RSP buffer into the SEST entry. Finally, in step 1010, the host queues an IRB to the ERQ that describes the desired I/O operation, including allocating an FC header structure for the FCP_CMND frame sent by the FCIP to the target node in an initial step of the I/O operation, includes a reference to the IRB in the SEST entry, and increments the ERQ producer index to indicate the queuing of the IRB to the FCIC. At the conclusion of step 1010, host activities required to initiate the desired I/O operation are complete.

FIG. 11 is a flow-control diagram that describes FCIC steps for execution of an I/O operation. In step 1102, the FCIC detects that the host has incremented the producer index for the ERQ. Detection may involve an interrupt of the FCIC control program generated by incrementing the producer index, or may involve alternative notification mechanisms. In step 1104, the FCIC accesses the IRB queued to the ERQ by the host. Of course, multiple IRBs may be queued to the ERQ before the FCIC has time to launch the I/O operations represented by a single IRB, in which case the steps shown in FIG. 11 are repeated for each queued IRB. In step 1106, the FCIC sends an FCP_CMND frame, previously prepared by the host and referenced from the accessed IRB, to the target node. The FCP_CMND frame includes an indication of the type of I/O operation initiated by the FCP_CMND frame. Then, in step 1108, the FCIC receives an FCP_XFER_RDY frame, in the case of a write I/O operation, and optionally receives an FCP_XFER_RDY frame in the case of a read I/O operation, from the target device. Note that the FCIC may conduct a variety of different steps and operations in the interval of time between steps 1106 and 1108 on behalf of other I/O operations or FC activities. In step 1110, the FCIC undertakes the data transfer portion of the I/O operation. In the case of a write I/O operation, the FCIC moves data from the memory buffers referenced from the SEST entry corresponding to the I/O operation into FCP_DATA frames and transmits the FCP_DATA frames to the target node. In the case of a read I/O operation, the FCIC receives FCP_DATA frames from the target node and moves the data included in the FCP_DATA frames into the memory buffers referenced from the SEST entry corresponding to the I/O operation. In step 1112, the FCIC receives an FCP_RSP frame from the target node that represents the final FC frame transfer for the I/O operation. Many different steps and operations may be performed by the FCIC in the interval of time between steps 1110 and 1112. In step 1114, the FCIC uses information in the FCP_RSP frame to identify the I/O operation corresponding to the FCP_RSP frame, and uses the OX_ID field of the FCP_RSP frame to access the SEST entry corresponding to the I/O operation. In step 1116, the FCIC uses the FCP_RSP buffer pointer included in the SEST entry to move the FCP_RSP frame, in one embodiment, or the data payload portion of the FCP_RSP frame, in an alternative embodiment, into the FCP_RSP buffer in host memory. In step 1118, the FCIC queues an inbound FCP exchange completion message to the IMQ to inform the host that the I/O operation has completed. Finally, in step 1120, the FCIC updates the producer index of the IMQ to indicate to the host processor that a completion message has been queued to the IMQ.

FIG. 12 illustrates the final steps undertaken by the host processor to complete an I/O operation. In step 1202, the host processor detects that the producer index to the IMQ has been updated by the FCIC. Detection may involve an interrupt automatically posted to a host driver or host software as a result of incrementing the producer index, or an alternative notification method. In step 1204, the host processor uses the SEST_INDEX field of the inbound FCP exchange completion message queued to the IMQ to locate the SEST entry corresponding to the I/O operation, the FCP_RSP buffer in which the FCP_RSP frame has been stored by the FCIC. In step 1206, the host processor parses the stored FCP_RSP frame to determine the status of the I/O operation, compares the contents of the EXP_BYTE_CNT field of the SEST entry to an indication of the number of bytes transferred during the I/O operation, reallocates the data buffers, FCP_RSP frame buffer, and other memory resources initially allocated for the I/O operation, sets a bit flag to indicate that the SEST entry is no longer occupied by valid data, updates the consumer indexes to indicate dequeuing of the IMQ and ERQ entries, and handles any error conditions that have transpired during execution and completion of the I/O operation, as detected from the status of the I/O operation and from the comparison of the EXP_BYTE_CNT field of the SEST entry to an indication of the number of bytes transferred during the I/O operation, inferred from the current index and offset into the memory buffers stored in the SEST entry or from other stored information.

Present Invention

By far the most common outcome of an I/O operation is a successful I/O operation completion. Therefore, in general, transfer of the FCP_RSP frame by the interface controller to host memory is largely unnecessary, since, following successful completion on an I/O operation, the host computer does not need to extract and examine information from the FCP response frame. Even queuing of a completion message to the IMQ is largely unnecessary. Instead, the host computer fibre channel driver or other software implementing host functions can be written to assume successful I/O completion. Thus, the completion message mechanism and transfer of FCP_RSP frames to host memory can be undertaken by the FCIC only in the case of unsuccessful completion, in which case the host fibre channel drivers or other software components are interrupted to handle errors resulting from the unsuccessful completion of the I/O operation. In order to complete an I/O operation, as discussed above, memory resources, such as IRBs within the ERQ and SEST entries, must be deallocated and returned to the pool of available IRBs and SEST entries. In order to avoid transmission of completion messages from the FCIC to the IMQ, these allocated memory resources may be deallocated and returned to the pool of available memory resources by an ASIC added to the FC port.

Figure 13:
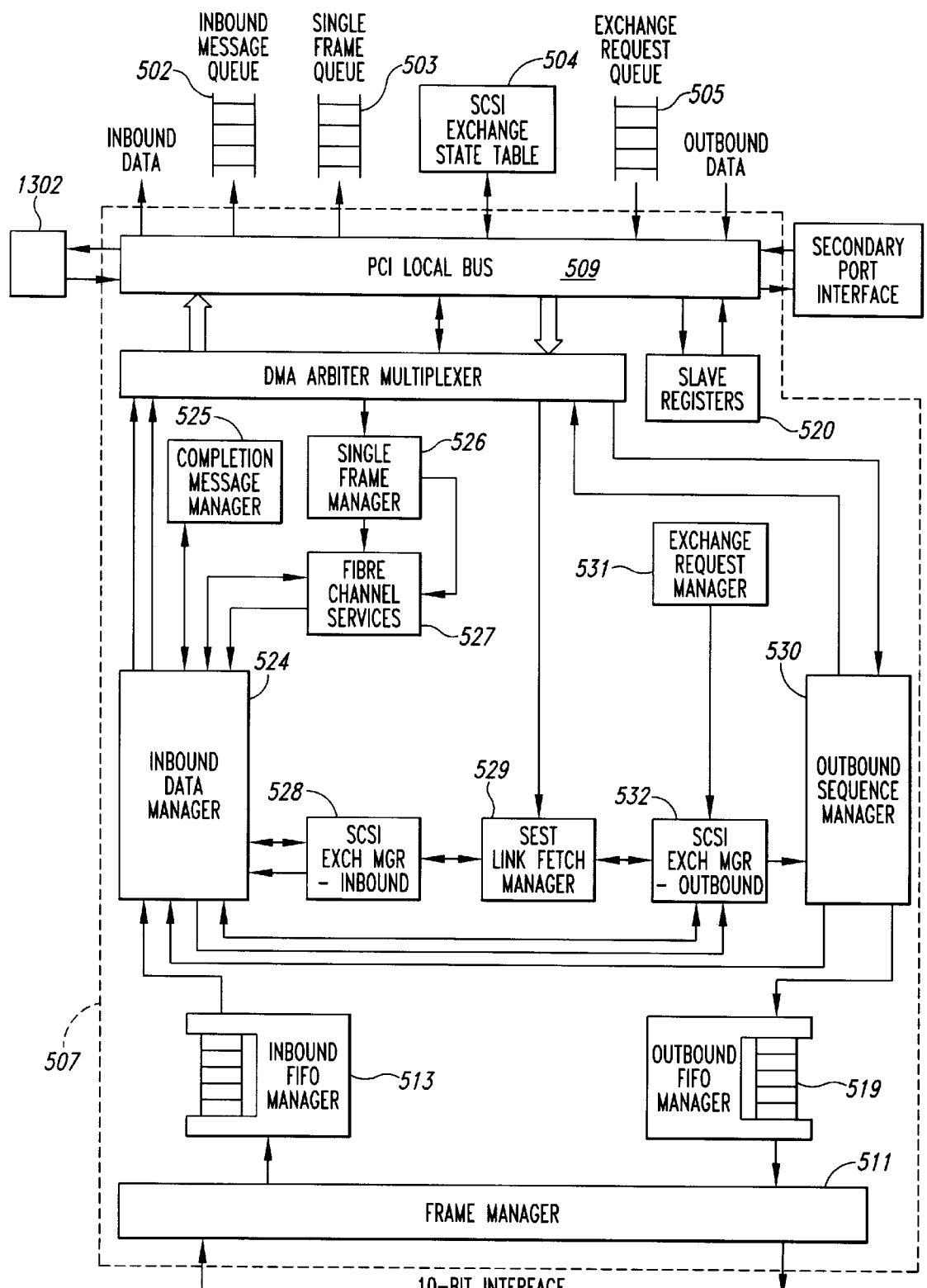
FIG. 13 shows a block diagram of the FCIC of one embodiment of the current invention.

FIG. 13 shows a block diagram of the FCIC similar to, and similarly labeled as, FIG. 5. FIG. 13 illustrates the addition of an ASIC 1302 to the FC node in order to implement one embodiment of the present invention. The ASIC 1302 serves both as an I/O bus controller controlling operations of the system I/O bus 509 as well as serving to manage host memory data structures during completion of I/O operations.

Figure 14:
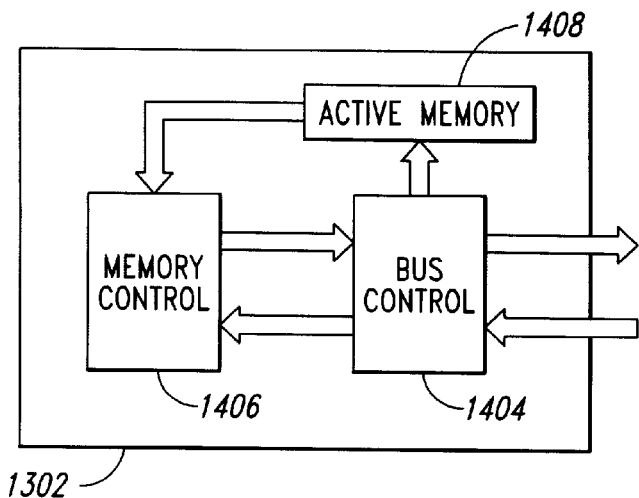
FIG. 14 is a block diagram of the ASIC shown in FIG. 13.

FIG. 14 is a block diagram of the ASIC shown in FIG. 13. The ASIC 1302 contains I/O bus control logic 1404, memory control logic 1406, and an active memory 1408 that is mapped as a special memory address accessible through the I/O system bus (509 in FIG. 5). The I/O bus control logic 1404 is, in one embodiment of the present invention, a standard PCI bus controller. The FCIC may write an FCP exchange ID through the special memory location to which the active memory 1408 is mapped. This active memory, when written to by the FCIC, automatically invokes memory control functionality implemented within the memory control logic circuitry 1406. The memory control logic is responsible for deallocating host memory resources allocated to the I/O operation identified by the FCP exchange ID written by the FCIC to the active memory 1408. Using the FCP exchange ID, the memory control logic can access host memory in order to deallocate the SEST entry corresponding to the I/O operation identified by the FCP exchange ID and perform any other standard cleanup operations conducted by the host computer in prior art methods and systems.

FIGS. 15–18 are flow-control diagrams describing host, FCIC, and ASIC operations carried out during processing of an I/O operation. Many of the steps in these flow-control diagrams are identical to steps in the flow-control diagrams shown in FIGS. 10–12. Such identical steps are labeled with the same numerical reference numbers in FIGS. 15–18 as they are labeled in FIG. 10–12. The following discussion will focus primarily on the steps in FIGS. 15–18 that differ from steps in FIGS. 10–12.

Figure 15:
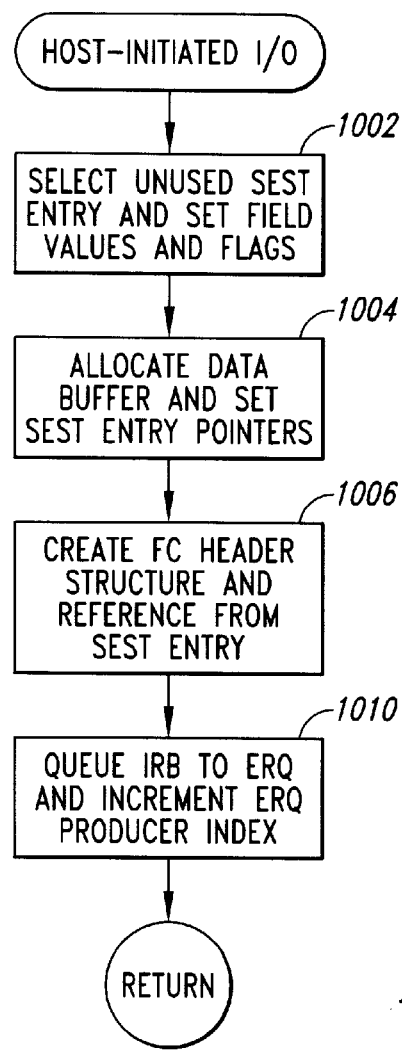
FIG. 15 is a flow-control diagram representing the steps carried out by the host computer in order to initiate an I/O operation in one embodiment of the present invention.

FIG. 15 is a flow-control diagram representing the steps carried out by the host computer in order to initiate an I/O operation in one embodiment of the present invention. FIG. 15 differs from FIG. 10 only in the omission of step 1008. Thus, in the described embodiment of the present invention, the host computer does not allocate a memory buffer for storing the FCP_RSP frame returned by the target node at the completion of the I/O operation.

Figure 16:
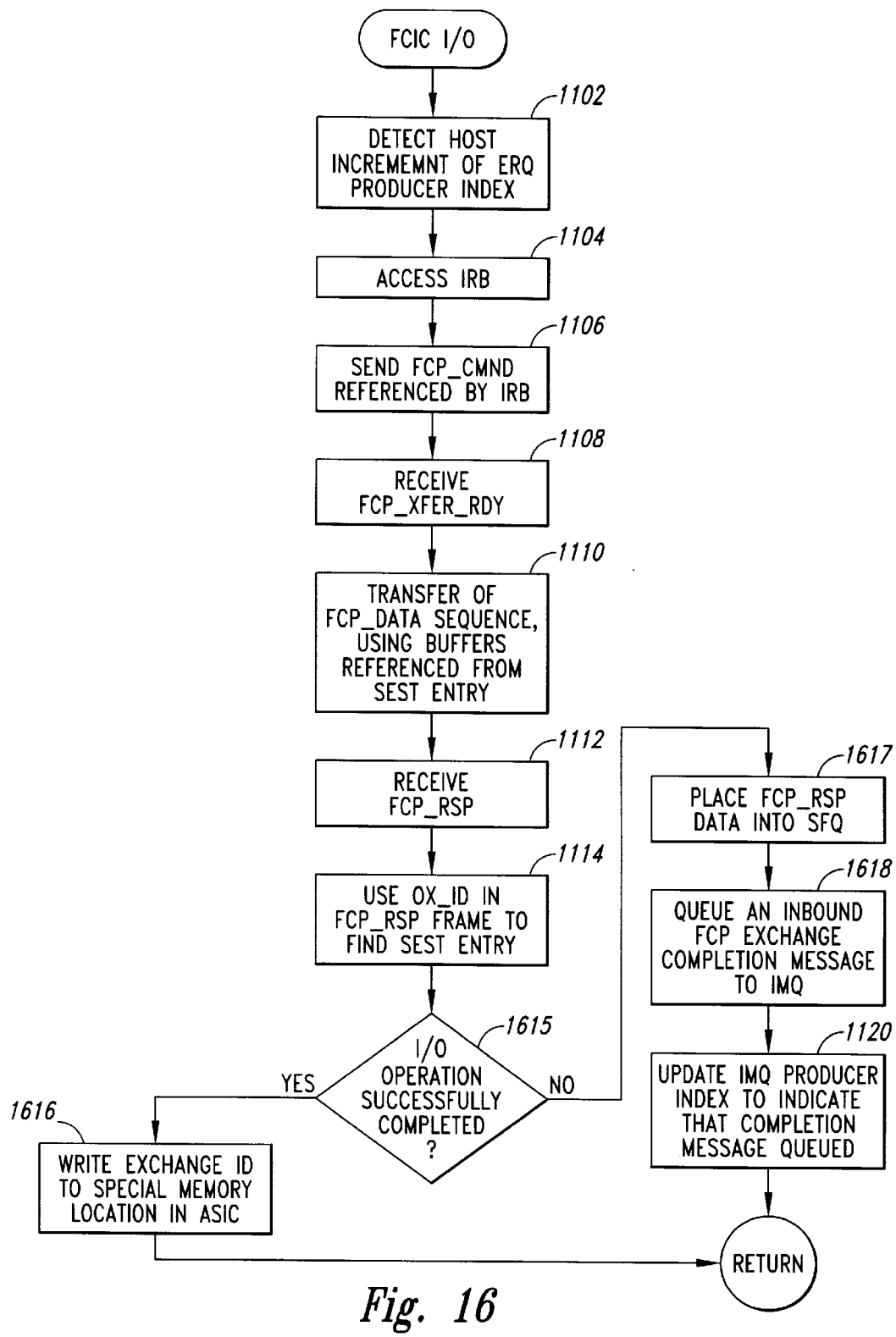
FIG. 16 is a flow-control diagram representing the steps carried out by the FCIC in order to execute and complete an I/O operation in one embodiment of the present invention.

FIG. 16 is a flow-control-diagram representing the steps carried out by the FCIC in order to execute and complete an I/O operation. Steps 1102–1114 in FIG. 16 are identical to steps 1102–1114, in FIG. 11, and will not be again described. However, once the FCIC receives the FCP_RSP frame from the target node as the last FCP sequence transmitted during the I/O operation, in step 1112, and uses information within the FCP_RSP frame to access SEST entry in host memory corresponding to the I/O operation in step 1114, then, in step 1615, the FCIC uses information contained in the FCP_RSP frame, internally maintained by the FCIC, and information stored in the SEST entry to determine whether or not the I/O operation successfully completed. There are two components to making this determination. A first part of the determination relates to examining information within the FCP_RSP frame returned from the target node. Two different FCP_RSP frame formats are defined as indicating successful completion of the I/O operation. The first format indicating successful completion has all bits, except for the FCP_CONF_REQ bit, of the FCP_STATUS field (240 in FIG. 2) equal to zero. The second format indicating successful completion has the FCP_RSP_LEN_VALID bit (byte 2, bit 0 of the FCP_STATUS field) set, or equal to 1, all other bits of the FCP_STATUS field except for the FCP_CONF_REQ bit unset, or equal to 0, and the RSP_CODE field (byte 3 of the FCP_RSP_INFO field (242 in FIG. 2)) equal to zero. Other than the two above-described FCP_RSP frame formats, FCP_RSP frames having any other format are considered to correspond to unsuccessfully completed I/O operations.

The second component of determining whether or not an I/O operation completed successfully involves the FCIC comparing the number of bytes of data that it transmitted, in the case of a write I/O operation, or received, in the case of a read I/O operation, to the number of bytes expected to be transferred for the I/O operation, as indicated by the EXP_BYTE_CNT field (720 in FIGS. 7A–B) of the SEST entry corresponding to the I/O operation. Only if the number of bytes transferred during the I/O operation is equal to the expected number of bytes to be transferred does the FCIC consider the I/O operation to have successfully completed. Both components of the determination are carried out by the FCIC in step 1615. Thus, in the current embodiment of the present invention, the FCIC offloads the processing chore of determining the completion status of the I/O operation from the host processor. It is more economical for the FCIC to make a determination, since the FCIC has already accessed the SEST entry and IRB corresponding to the I/O operation and is currently in possession of the FCP_RSP frame returned by the target node.

If the FCIC determines, in step 1615, that the I/O operation successfully completed, then, in step 1616, the FCIC extracts the FCP exchange ID (fields 220 and 222 in FIG. 2) from the FCP_RSP frame and writes the extracted FCP exchange ID into the special memory location to which the active memory component of the ASIC (1408 in FIG. 14) is mapped. This completes the I/O operation from the standpoint of the FCIC. If, on the other hand, the I/O operation is determined by the FCIC to not have successfully completed in step 1615, then, in step 1617, the FCIC places the FCP_RSP frame into the SFQ (503 in FIG. 5). Following queuing of the FCP_RSP frame to the SFQ, the FCIC, in step 1618, queues an inbound FCP exchange completion message to the IMQ to represent the completion, albeit unsuccessful completion, of the I/O operation. In one embodiment, the host software is implemented to expect that inbound FCP exchange completion messages will be queued to the IMQ only in the case that the corresponding I/O operations did not successfully complete. In alternate embodiments, the prior art implementation, in which inbound FCP exchange completion messages are queued to the IMQ in all cases, may be maintained, and unsuccessful I/O completions may be indicated by setting of a bit flag within the inbound FCP exchange completion message. For example, the FEE bit flag (908 in FIG. 9) may be used for this purpose. Finally, the FCIC updates the IMQ producer index in step 1120.

Figures 17, 18:
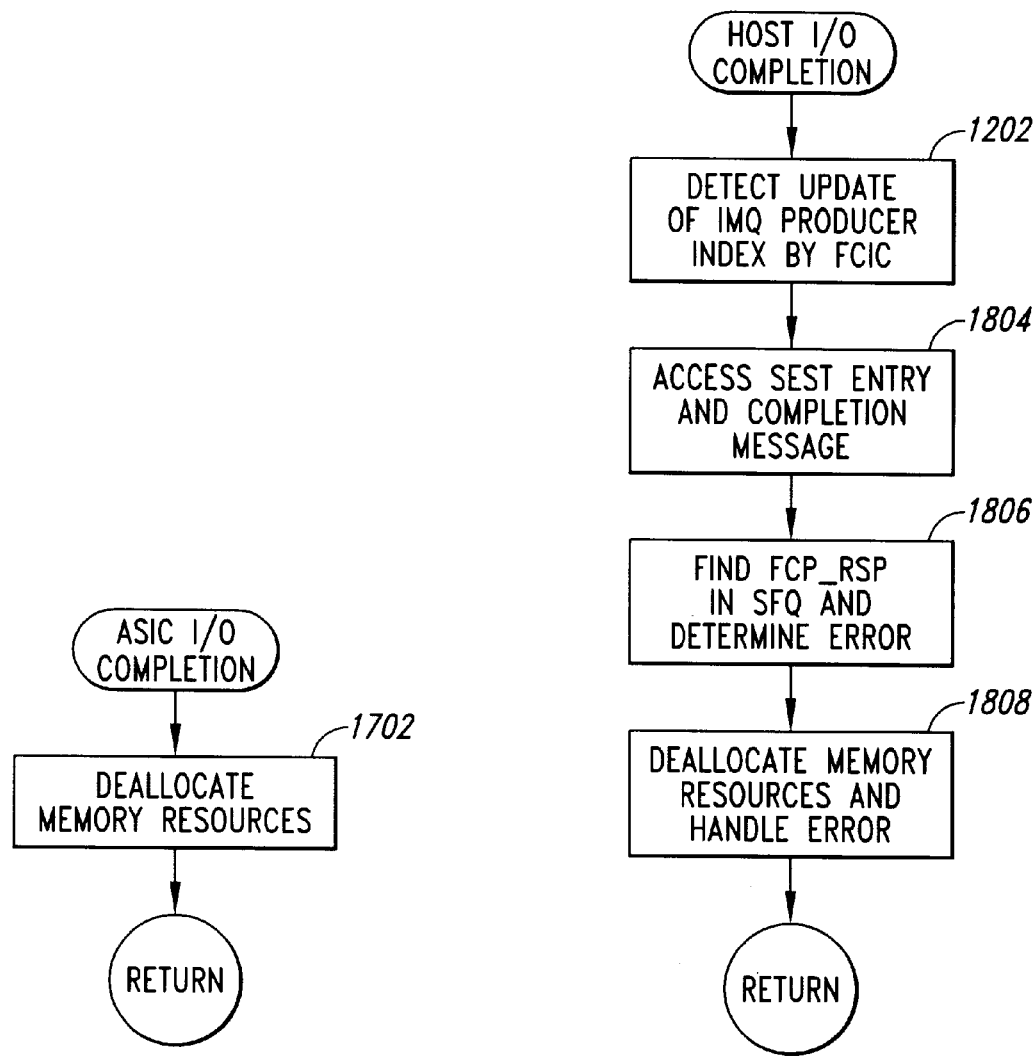
FIG. 17 is a concise flow-control diagram representing the steps carried out by the ASIC following writing of an FCP exchange ID to an active memory component of the ASIC.
FIG. 18 is a flow-control diagram representing the steps carried out by the host computer at the conclusion of an unsuccessful host-initiated I/O operation.

FIG. 17 is a concise flow-control diagram representing the steps carried out by the ASIC following writing of an FCP exchange ID to the active memory component (1408 of FIG. 14) of the ASIC. In step 1702, the ASIC deallocates any host memory resources corresponding to the I/O operation identified by the FCP exchange ID. This cleanup task is identical to the cleanup task carried out by host software during completion of an I/O operation in prior art methods and systems. This task includes de-allocating the SEST entry corresponding to the completed I/O operation.

FIG. 18 is a flow-control diagram representing the steps carried out by a host computer at the conclusion of an unsuccessful host-initiated I/O operation. FIG. 18 is somewhat analogous to FIG. 12, described above. Following the interrupt generated by updating of the IMQ producer index by the FCIC, in step 1202, the host computer accesses the SEST entry using information contained within the completion message accessed by the host computer within the IMQ. In step 1806, the host computer finds the FCP_RSP frame corresponding to the I/O operation in the SFQ and uses information contained within the FCP_RSP frame and SEST entry to determine the nature of the error or errors that occurred to cause the I/O operation to unsuccessfully complete. Finally, in step 1808, the host computer handles the error conditions detected in step 1806 and then deallocates the memory resources in the same fashion as memory resources are deallocated at the conclusion of an I/O operation in prior art methods and systems, with the exception that an FCP_RSP frame buffer need not be deallocated, as well as by the ASIC in the currently described embodiment of the present invention at the conclusion of a successfully completed I/O operation.

Thus, in the normal case that an I/O operation successfully completes, the host processor does not need to access the SEST entry in order to determine whether the expected number of bytes were transferred and does not need to process a completion message, saving host processor cycles, does not need to allocate memory for the FCP_RSP frame, and does not need to access the FCP_RSP frame. Moreover, the system bus connecting host memory to the FCIC is not burdened with transfer of the FCP_RSP frame from the FCIC to host memory, transfer of a completion message to host memory, and update of the IMQ producer index in the common case where the FCP_RSP frame is not needed by the host processor. The host processor additionally avoids the processing overhead of the completion tasks those tasks offload to the ASIC and FCIC. Thus, host memory becomes more available under the present invention, the system I/O bus has greater available bandwidth for data transfer, the host computer expends less processing cycles to complete an I/O operation, and, as a result, I/O operation latency is decreased.

Although the present invention has been described in terms of a particular embodiment, it is not intended that the invention be limited to this embodiment. Modifications within the spirit of the invention will be apparent to those skilled in the art. For example, the memory control functionality implemented in the memory control block (1406 in FIG. 14) of the ASIC may be implemented in an almost limitless number of different logic circuit configurations. The increased functionality within the FCIC, represented in FIG. 16 by steps 1615, 1616, and 1617, may be implemented in many different types of logic circuits, firmware, or a combination of logic circuits and firmware. In the above-described implementation, the ASIC performs I/O system bus control functionality as well as host memory control functionality. In alternate embodiments, the ASIC may have different tasks and capabilities. The active memory component of the ASIC may be accessed by the FCIC by means other than writing an FCP exchange ID to a special memory location via the system I/O bus. Other signaling mechanisms may be employed to invoke ASIC-mediated host memory operations. For example, a direct electrical coupling between the FCIC and ASIC may alternately be provided. In the above-described embodiment, interrupts are generated to invoke host and interface controller processing of I/O operations, but other signaling methods may be employed. These are a few examples of the many different types of alternate embodiments through which the present invention may be expressed.

The foregoing description, for purposes of explanation, used specific nomenclature to provide a thorough understanding of the invention. However, it will be apparent to one skilled in the art that the specific details are not required in order to practice the invention. In other instances, well-known circuits and devices are shown in block diagram form in order to avoid unnecessary distraction from the underlying invention. Thus, the foregoing descriptions of specific embodiments of the present invention are presented for purposes of illustration and description; they are not intended to be exhaustive or to limit the invention to the precise forms disclosed, obviously many modifications and variations are possible in view of the above teachings. The embodiments were chosen and described in order to best explain the principles of the invention and its practical applications and to thereby enable others skilled in the art to best utilize the invention and various embodiments with various modifications as are suited to the particular use contemplated. It is intended that the scope of the invention be defined by the following claims and their equivalents:

What is claimed is:

1. A method for completing execution of a remote transaction within a fibre channel node having an interface controller, application specific integrated circuit, host processor, and host memory, the method comprising:

receiving a response frame from a remote node by the interface controller;

parsing the response frame by the interface controller to determine a completion status for the remote transaction;

comparing, by the interface controller, an indication of a number of bytes transferred during the remote transaction to an indication of an expected number of bytes to be transferred during the remote transaction;

when the completion status and comparison of the indication of the number of bytes transferred during the remote transaction to the indication of the expected number of bytes to be transferred during the remote transaction indicates that the remote transaction successfully completed, extracting an exchange identifier from the response frame and writing the exchange identifier to an active memory component of the application specific integrated circuit; and when the completion status and comparison of the indication of the number of bytes transferred during the remote transaction to the indication of the expected number of bytes to be transferred during the remote transaction indicates that the remote transaction did not successfully complete, queuing to the message queue within the host memory a completion message that includes an indication that the remote transaction did not successfully complete, and transferring data from the response frame to the host memory.

2. The method of claim 1 wherein the remote transaction is an I/O operation directed to the remote node.

3. The method of claim 2 wherein two different response frame formats are defined to indicate successful completion of an I/O operation, the two different response frame formats including:
   a first response frame format having all bits, except for the FCP_CONF_REQ bit, of the FCP_STATUS field cleared; and
   a second response frame format having the FCP_RSP_LEN_VALID bit of the FCP_STATUS field set, having all other bits of the FCP_STATUS field except for the FCP_CONF_REQ bit cleared, and having the RSP_CODE field cleared.

4. The method of claim 3 wherein queuing a completion message to the message queue within the host memory generates an interrupt to invoke processing of the completion message by the host processor.

5. The method of claim 4 wherein processing of the completion message by the host processor includes dequeuing the completion from the message queue and deallocating host memory resources allocated for the I/O operation.

6. The method of claim 4 wherein transferring data from the response frame to the host memory further includes queuing the data from the response frame to a queue within the host memory to which inbound frames that cannot be processed by the interface controller are queued.

7. The method of claim 3 wherein, upon successful I/O operation completion and writing the exchange identifier to the active memory component of the application specific integrated circuit, the application specific integrated circuit manages deallocation of host memory resources allocates to the I/O operation.

8. A fibre channel node that efficiently completes execution of a remote transaction with a remote node, the fibre channel node comprising:
   a host processor that initiates the remote transaction;
   a host memory in which the host processor stores information related to the initiated remote transaction;
   an application specific integrated circuit that includes an active memory component and logic for deallocating host memory resources allocated for storing information related to the initiated remote transaction; and
   an interface controller that
      accesses the information related to the initiated remote transaction in the host memory,
      carries out an exchange of fibre channel frames with the remote node to execute the remote transaction,
      receives a final response frame the remote node,
      pareses information contained in the response frame to determine if the remote transaction successfully completed, and
      when the remote transaction does not successfully complete, queues a completion message to a message queue in the host memory that includes an indication of unsuccessful completion and when the remote transaction does successfully complete, extracts an exchange identifier from the response frame and writing the exchange identifier to an active memory component of the application specific integrated circuit.

9. The fibre channel node of claim 8 wherein the remote transaction is a host processor initiated I/O operation.

10. The fibre channel node of claim 9 wherein the host processor stores an indication in the host memory of a number of bytes expected to be transferred during the I/O operation, and wherein the interface controller access the indication of the number of bytes expected to be transferred during the I/O operation and compares the accessed indication to an internal indication of the number of bytes transferred during the I/O operation, in addition to parsing information contained in the response frame, to determine if the I/O operation successfully completed.

11. The fibre channel node of claim 9 wherein, when the interface controller determines that the I/O operation did not successfully complete, the interface controller transfers data from the final response frame to the host memory in addition to queuing a completion message to a message queue in the host memory that includes an indication that the I/O operation did not successfully complete.

12. The fibre channel node of claim 11 wherein transferring data from the response frame to the host memory further includes queuing the data from the response frame to a queue within the host memory to which inbound frames that cannot be processed by the interface controller are queued.

13. The fibre channel node of claim 9 wherein two different response frame formats are defined to indicate successful completion of an I/O operation, the two different response frame formats including:
   a first response frame format having all bits, except for the FCP_CONF_REQ bit, of the FCP_STATUS field cleared; and
   a second response frame format having the FCP_RSP_LEN_VALID bit of the FCP_STATUS field set, having all other bits of the FCP_STATUS field except for the FCP_CONF_REQ bit cleared, and having the RSP_CODE field cleared.

14. The fibre channel node of claim 9 wherein queuing the completion message to the message queue within the host memory generates an interrupt to invoke processing of the completion message by the host processor.

15. The fibre channel node of claim 14 wherein processing of the completion message by the host processor includes dequeuing the completion from the message queue and deallocating host memory resources allocated for the I/O operation.

16. The fibre channel node of claim 9 wherein. when the interface controller extracts the exchange identifier from the response frame and writes the exchange identifier to the active memory component of the application specific integrated circuit, the application specific integrated circuit manages deallocation of host memory resources allocates to the I/O operation.

* * * * *